United States Patent
Choi et al.

(10) Patent No.: US 7,964,680 B2
(45) Date of Patent: Jun. 21, 2011

(54) METHOD FOR POLYMERIZING CYCLIC OLEFIN HAVING POLAR FUNCTIONAL GROUP, OLEFIN POLYMER PRODUCED THEREBY, OPTICAL ANISOTROPIC FILM COMPRISING THE SAME, AND CATALYST COMPOSITION FOR POLYMERIZING THE CYCLIC OLEFIN

(75) Inventors: Dai-Seung Choi, Daejeon Metropolitan (KR); Young-Whan Park, Daejeon Metropolitan (KR); Sung-Ho Chun, Daejeon Metropolitan (KR); Sung Cheol Yoon, Daejeon Metropolitan (KR); Young-Chul Won, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 296 days.

(21) Appl. No.: 12/308,399

(22) PCT Filed: Jun. 15, 2007

(86) PCT No.: PCT/KR2007/002896
§ 371 (c)(1),
(2), (4) Date: Dec. 15, 2008

(87) PCT Pub. No.: WO2007/145478
PCT Pub. Date: Dec. 21, 2007

(65) Prior Publication Data
US 2010/0240849 A1    Sep. 23, 2010

(30) Foreign Application Priority Data

Jun. 16, 2006  (KR) .......................... 10-2006-0054367
Jan. 10, 2007  (KR) .......................... 10-2007-0003074

(51) Int. Cl.
  C08F 4/70   (2006.01)
  C08F 4/80   (2006.01)
  C08F 132/04 (2006.01)
(52) U.S. Cl. ........ 526/139; 526/126; 526/128; 526/132; 526/134; 526/138; 526/145; 526/281; 502/121; 502/162
(58) Field of Classification Search .................. 526/139, 526/145, 281, 282, 126, 128, 132, 134, 138; 502/121, 162; 428/1.1
See application file for complete search history.

(56) References Cited

U.S. PATENT DOCUMENTS

| | | | |
|---|---|---|---|
| 3,330,815 A | 7/1967 | McKeon et al. | |
| 5,468,819 A | 11/1995 | Goodall et al. | |
| 5,569,730 A | 10/1996 | Goodall et al. | |
| 5,705,503 A | 1/1998 | Goodall et al. | |
| 5,912,313 A | 6/1999 | McIntosh, III et al. | |
| 6,031,058 A | 2/2000 | McIntosh, III et al. | |
| 6,197,910 B1 | 3/2001 | Weng et al. | |
| 6,455,650 B1 | 9/2002 | Lipian et al. | |
| 6,541,585 B2 | 4/2003 | Johnson et al. | |
| 6,677,419 B1 | 1/2004 | Brock et al. | |
| 7,786,231 B2 * | 8/2010 | Yoon et al. .................... | 526/171 |
| 2005/0085606 A1 * | 4/2005 | Yoon et al. .................... | 526/282 |
| 2007/0123667 A1 * | 5/2007 | Oshima et al. ................ | 526/171 |

FOREIGN PATENT DOCUMENTS

| | | | |
|---|---|---|---|
| DE | 42 02 108 A1 | | 7/1993 |
| EP | 0 426 637 A2 | | 5/1991 |
| KR | 10-2006-0052530 | | 5/2006 |
| WO | WO 2005/019277 | * | 3/2005 |
| WO | WO 2006-052091 A1 | | 5/2006 |

OTHER PUBLICATIONS

Ivin, K. J.; O'Donnel, J. H.; Rooney, J. J.; Steward, C. D. Malcromol. Chem. 1979, vol. 180, 1975.
Gaylord, N.G.; Deshpande, A.B.; Mandal, B.M.; Martan, M. J. Macromol. Sci.-Chem. 1977, vol. A11(5),1053-1070.
Kaminsky, W.; Bark, A.; Drake, I. Stud. Surf. Catal. 1990, vol. 56, 425.
Sen, A.; Lai, T.-W. J. Am. Chem. Soc. 1981, vol. 103, 4627-4629.
Sen, et al., Organometallics 2001, vol. 20, 2802-2812.
Chem. Rev. 1988, vol. 88, 1405-1421.
Chem. Rev. 1993, vol. 93, 927-942.
Kaminsky et al. Angew. Chem. Int. Ed., 1985, vol. 24, 507.
Brookhart et al. Chem. Rev. 2000, vol. 100, 1169.
Resconi et al. Chem. Rev. 2000, vol. 100, 1253.
Kaminsky et al. Macromol. Symp. 1995, vol. 97, 225.

* cited by examiner

*Primary Examiner* — Fred M Teskin
(74) *Attorney, Agent, or Firm* — McKenna Long & Aldridge LLP

(57) ABSTRACT

Disclosed is a method of producing a cyclic olefin polymer having a polar functional group, an olefin polymer produced by using the method, an optical anisotropic film including the olefin polymer, and a catalyst composition for producing the cyclic olefin polymer. In the olefin polymerization method and the catalyst composition for polymerization, since deactivation of the catalyst due to polar functional groups of monomers is capable of being suppressed, it is possible to produce polyolefins having a high molecular weight at high polymerization yield during polyolefin polymerization. Furthermore, the cyclic olefin having the polar functional groups has excellent polymerization reactivity and the activity of the catalyst composition including the same is maintained under a variable polymerization condition. Accordingly, the present invention is very useful for a mass-production process.

28 Claims, No Drawings

METHOD FOR POLYMERIZING CYCLIC OLEFIN HAVING POLAR FUNCTIONAL GROUP, OLEFIN POLYMER PRODUCED THEREBY, OPTICAL ANISOTROPIC FILM COMPRISING THE SAME, AND CATALYST COMPOSITION FOR POLYMERIZING THE CYCLIC OLEFIN

This application claims the benefit of PCT/KR2007-02896 filed on Jun. 15, 2007 and also Korean Patent Application Nos. 10-2006-0054367 and 10-2007-003074 filed on Jun. 16, 2006 and Jan. 10, 2007 respectively, the contents of which is hereby incorporated herein by reference in their entirety.

TECHNICAL FIELD

The present invention relates to a method of producing a cyclic olefin polymer and a catalyst composition for producing the cyclic olefin polymer. More particularly, the present invention pertains to a method of producing a cyclic olefin polymer having a polar functional group using a catalyst composition which contains a metal compound of Group 10, an organophosphorus ligand, and a salt compound, an olefin polymer produced by using the method, an optical anisotropic film including the polymer, and a catalyst composition for producing a cyclic olefin polymer having a polar functional group.

The polymer may be used as electronic materials such as insulating films of semiconductors or TFT-LCDs, films for protecting polarizing plates, multichip modules, integrated circuits, printed circuit boards, sealing materials for electronic devices, or flat panel displays.

The cyclic olefin polymer is a polymer of cyclic monomers such as norbornene, and has better transparency, heat resistance, and resistance to chemicals, and very low birefringence and water absorption as compared to a known olefin polymer. Therefore, the cyclic olefin polymer may be used as optical materials such as CD, DVD, and POFs (Plastic Optical Fibers), information electronic materials such as capacitor films and low dielectric materials, and medical materials such as syringes having the low absorption property and blister packaging.

Examples of a polymerization method of the cyclic olefin may include ROMP (Ring Opening Metathesis Polymerization), copolymerization in conjunction with ethylene, and addition polymerization shown in the following Reaction scheme 1. In the above-mentioned polymerization methods, transition metal catalysts such as metallocene compounds and Ni or Pd-compounds are used. Characteristics of the polymerization reaction and polymers to be produced depend on the central metal, the ligand, and the composition of the catalyst.

[Reaction scheme 1]

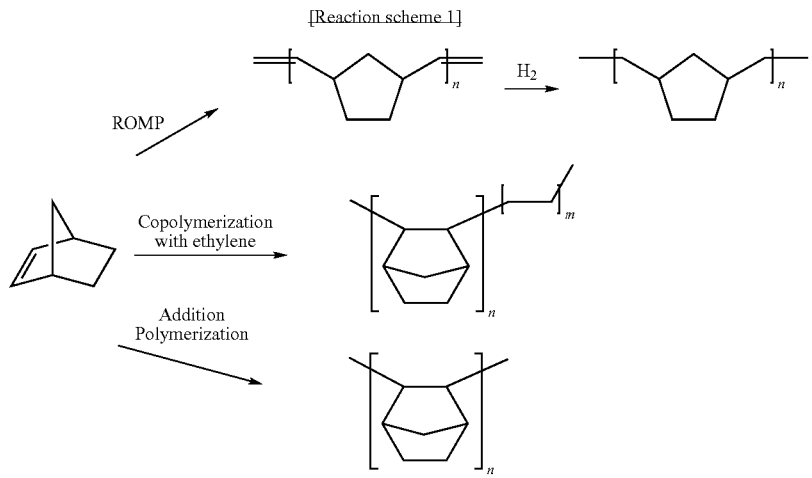

This application claims priority from Korea Patent Application Nos. 10-2006-0054367 filed on Jun. 16, 2006 and 10-2007-0003074 filed on Jan. 10, 2007 in the KIPO, the disclosure of which is incorporated herein by reference in its entirety.

BACKGROUND ART

In the recent information and electronic industry, inorganic substances such as silicon oxides or silicon nitrides have been frequently used. However, the demand for novel materials having high performance is growing in accordance with the increased requirement for small-sized devices having high efficiency. An interest in polymer that has low dielectric constant and water absorption, excellent metal adhesion, mechanical strength, thermal stability, and transparency, and high glass transition temperature (Tg>250° C.) as a material capable of satisfying the high-performance properties is growing.

In respects to the catalyst used in the ROMP, chlorides such as $TiCl_4$ and $WCl_6$ or carbonyl organic metal compounds are reacted with Lewis acid cocatalysts such as $R_3Al$ and $Et_2AlCl$ to form metal carbene or metallocyclobutane catalyst active species. The active species are reacted with double bonds of olefins to be ring-opened via a ring intermediate of metallocyclobutane, thereby forming a final product having a double bond (Ivin, K. J.; O'Donnel, J. H.; Rooney, J. J.; Steward, C. D. Makromol. Chem. 1979, Vol. 180, 1975). Since the polymer that is produced by using the ROMP has one double bond per a repeating unit of monomer, thermal stability and oxidation stability are significantly reduced. Thus, the polymer is frequently used as a thermosetting resin.

The first copolymer of ethylene and norbornene was produced by using a titanium-based Ziegler-Natta catalyst manufactured by Leuna, Co., but is disadvantageous in that the produced copolymer is not transparent due to residual impurity and Tg is limited within a range of 140° C. or less (Koinzer, P. et al., German Pat. No. 109,224).

With respect to the addition polymerization method of the cyclic olefin monomers, Gaylord, N. G. et al. suggested a method of polymerizing norbornene by using a [Pd($C_6H_5$CN)$Cl_2]_2$ catalyst (Gaylord, N. G.; Deshpande, A. B.; Mandal, B. M.; Martan, M. J. Macromol. Sci. -Chem. 1977, Vol. A11(5), 1053 - 1070). Polynorbornene that is produced by using a zirconium-based metallocene catalyst has very high crystallinity, is not dissolved in a typical organic solvent, has no glass transition temperature, and is thermally decomposed (Kaminsky, W.; Bark, A.; Drake, I. Stud. Surf. Catal. 1990, Vol. 56, 425). On the other hand, polynorbornene that is produced by using a Pd-metal catalyst is dissolved in an organic solvent such as tetrachloroethylene, chlorobenzene, or dichlorobenzene, and has a molecular weight of 100,000 or more and Tg of 300° C. or higher.

However, in order to use polymers as information and electronic materials, predetermined adhesion strength is required to a surface of metal such as silicon, silicon oxides, silicon nitrides, alumina, copper, aluminum, gold, silver, platinum, titanium, nickel, tantalum, and chromium. Accordingly, in the case of the norbornene polymer, efforts have been made to provide a polar functional group to a norbornene monomer in order to control metal adhesion and various electric, optical, chemical, and physical properties.

U.S. Pat. No. 3,330,815 discloses a method of polymerizing norbornene monomers having polar functional groups by using $(PhCN)_2PdCl_2$ dimers and the like as a catalyst. However, the method is problematic in that since the catalyst species are deactivated due to the polar functional groups of the monomers to disturb a polymerization reaction, it is difficult to obtain a polymer having a molecular weight of 10,000 or more.

U.S. Pat. No. 5,705,503 discloses a method of polymerizing norbornene monomers having polar functional groups by using ((Allyl)PdCl)$_2$/AgSbF$_6$ as a catalyst composite. However, in the method, a ratio of the catalyst to the monomers is 1:100 to 1:250, which means that the catalyst is used in an excessive amount. Accordingly, since the large amount of catalyst residue remains in the final polymer, there are possibilities of deterioration of the polymer resulting from thermal oxidation and reduction in light transmission.

In the case of when ester norbornene monomers are polymerized by using a cation type [Pd($CH_3$CN)$_4$][$BF_4$]$_2$ catalyst, the polymerization yield is low and exo isomers are selectively polymerized (Sen, A.; Lai, T. W. J. Am. Chem. Soc. 1981, Vol. 103, 4627-4629). In the case of when norbornene having an ester group or an acetyl group is polymerized, since the catalyst needs to be used in an excessive amount so that a ratio of the catalyst to monomers is about 1/100 to 1/400, it is difficult to remove the catalyst residue after the polymerization.

U.S. Pat. No. 6,455,650 discloses a method of polymerizing norbornene monomers having functional groups by using [(R')$_z$M(L')$_x$(L")$_y$]$_b$[WCA]$_d$ as a catalyst composite. However, the method is problematic in that since the yield is 5% which is considered to be very low in the case of when the norbornene monomers having the functional groups are polymerized, it is difficult for the catalyst composite to be used to produce the polymer having the polar functional groups.

The document which has been made by Lipian et al. (Sen, et al., Organometallics 2001, Vol. 20, 2802-2812) discloses that in a polymerization reaction of ester norbornene by activating [(1,5-cyclooctadiene) ($CH_3$)Pd(Cl)] by means of an organic phosphorus system such as $PPh_3$ and a cocatalyst such as [Na]$^+$[B(3,5-($CF_3$)$_2$$C_6H_3$)$_4$]$^-$, an excessive amount of catalyst is used so that a ratio of the catalyst to monomers is about 1/400 to produce a polymer having a molecular weight of about 6,500 at a polymerization yield of 40% or less.

Meanwhile, a catalyst system that is used in the above-mentioned polymerization methods typically includes a main catalyst which is a metal complex and a cocatalyst which is an ionic compound.

A homogeneous Ziegler-Natta catalyst system that is a catalyst having multi-active sites used in a known polymerization process includes methyl aluminoxane (MAO) as a cocatalyst to improve reactivity of the catalyst. However, the catalyst system is problematic in that since it should be used in an excessive amount in respects to a catalyst precursor, economic efficiency is poor and undesirable postprocess should be performed.

After a metallocene catalyst having a single active site was developed, in order to avoid the above-mentioned problems, perfluoroarylborate type of noncoordination anions that are capable of providing a single cation active species to a catalyst precursor, has electric charges that are as low as −1 or −2, and are used to desirably perform delocalization of the electric charges have been used as a cocatalyst (Chem. Rev. 1988, Vol. 88, 1405-1421; Chem. Rev. 1993, Vol. 93, 927-942).

The anions are used in a salt form along with trityl cations that are used to perform a removal reaction of alkide or hydride or dialkylammonium cations that are used to perform protonolysis. Representative examples of the borate cocatalyst compound may include [Ph$_3$C][B($C_6F_5$)$_4$] and [PhNMe$_2$H][B($C_6F_5$)$_4$].

During the polymerization reaction, the cation portions of the cocatalyst are reacted with leaving groups of the metal precursor to provide cationic properties to the metal precursor and form ion pairs along with anion portions of the cocatalyst. In this connection, the anions are slightly coordinated with the metal and easily exchanged with olefin monomers, causing a polymerization reaction.

However, since the ion pairs substantially act as the catalyst active species but are thermally and chemically unstable, the ion pairs are sensitively reacted with solvents and monomers to reduce reactivity of the catalyst. Particularly, in the case of the cocatalyst compound containing nitrogen, a neutral amine compound is generated during an activation reaction of the catalyst, and the amine compound is capable of strongly interacting with a cation type organic metal catalyst, causing reduction in activity of polymerization. In order to avoid this, the use of carbenium, oxonium, and sulfonium cations instead of ammonium cations is known in the art (EP No. 0426,637).

Meanwhile, in the case of when cyclic olefin monomers are polymerized by using MAO or organic aluminum as a cocatalyst, high polymerization activity is ensured during polymerization of nonpolar norbornene such as norbornene, alkylnorbornene, and silylnorbornene. However, the very low polymerization activity is ensured in respects to polar norbornene such as ester or acetyl norbornene (U.S. Pat. Nos. 5,468,819, 5,569,730, 5,912,313, 6,031,058, and 6,455,650).

That is, in the case of catalyst system for polymerizing cyclic olefins having the polar functional group, the catalyst system is produced by using various types of cocatalysts. However, since the catalyst is sensitively reacted with monomers to be deactivated due to the polar functional group or to have reduced thermal stability, it is difficult for the catalyst system to be used in high temperature polymerization. Accordingly, in the case of typical olefins having the polar functional group, it is impossible to obtain the polymerization yield, the molecular weight of the polymer to be produced, and the amount of the catalyst that satisfy all the requirements. In addition, in the case of when the catalyst is used in an excessive amount, there are problems in that the obtained polymer is colored and transparency is poor.

Accordingly, there is a need to provide an addition polymerization method of cyclic olefins having a polar functional group and a catalyst composition for producing a cyclic olefin polymer having a polar functional group. In the method, the above-mentioned problems occurring in the related art are avoided, a cyclic olefin polymer having a high molecular weight and the polar functional group is capable of being produced at high yield, and the catalyst residue is not generated.

Disclosure

Technical Problem

The present invention has been made keeping in mind the above problems occurring in the related art, and a first object of the present invention is to provide a method of producing a cyclic olefin polymer having a polar functional group and a high molecular weight at high yield while deactivation of a catalyst due to the polar functional group, water, and oxygen does not occur.

It is a second object of the present invention to provide a cyclic olefin polymer having a polar functional group which has a high glass transition temperature, and excellent thermal stability, oxidation stability, resistance to chemicals, and metal adhesion.

It is a third object of the present invention to provide an optical anisotropic film that includes the olefin polymer.

It is a fourth object of the present invention to provide a catalyst composition for producing a cyclic olefin polymer which has a polar functional group and a high molecular weight at high yield while deactivation of a catalyst which may be caused by the polar functional group does not occur because of excellent thermal and chemical stabilities.

Technical Solution

In order to achieve the first object, the present invention provides a method of producing a cyclic olefin polymer having a polar functional group, including the step of bringing a catalyst mixture into contact with a monomer solution containing cyclic olefin monomers having a polar functional group. The catalyst mixture includes a precatalyst containing metal of Group 10 represented by Formula 1, an organophosphorus ligand represented by Formula 2, and a cocatalyst that is a salt compound slightly coordinated with the metal of Group 10 represented by Formula 3 and providing an anion:

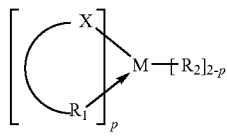

[Formula 1]

wherein Xs are each independently a hetero atom selected from S, O, and N, $R_1$s are each independently —CH=CHR$^{20}$, —OR$^{20}$, —SR$^{20}$, —N(R$^{20}$)$_2$, —N=NR$^{20}$, —P(R$^{20}$)$_2$, —C(O)R$^{20}$, —C(R$^{20}$)=NR$^{20}$, —C(O)OR$^{20}$, —OC(O)OR$^{20}$, —OC(O)R$^{20}$, —C(R$^{20}$)=CHC(O)R$^{20}$, —R$^{21}$C(O)R$^{20}$, —R$^{21}$C(O)OR$^{20}$, or —R$^{21}$OC(O)R$^{20}$, R$^{20}$s are each independently hydrogen, halogen, linear or branched alkyl having 1 to 5 carbon atoms, linear or branched haloalkyl having 1 to 5 carbon atoms, cycloalkyl having 5 to 10 carbon atoms, linear or branched alkenyl having 2 to 5 carbon atoms, linear or branched haloalkenyl having 2 to 5 carbon atoms, or substituted or unsubstituted aralkyl having 7 to 24 carbon atoms; R$^{21}$ is hydrocarbylene having 1 to 20 carbon atoms, $R_2$s are each independently linear or branched alkyl having 1 to 20 carbon atoms, linear or branched alkenyl having 2 to 20 carbon atoms, linear or branched vinyl having 2 to 20 carbon atoms, cycloalkyl having 5 to 12 carbon atoms unsubstituted or substituted with hydrocarbon aryl having 6 to 40 carbon atoms unsubstituted or substituted with hydrocarbon, aralkyl having 7 to 15 carbon atoms unsubstituted or substituted with hydrocarbon, or alkynyl having 3 to 20 carbon atoms, M is metal of Group 10, and
p is 0 to 2,

[Z(R$_3$)$_a$]—P[Z'(R$_4$)$_b$][Z"(R$_5$)$_c$]  [Formula 2]

wherein a, b, and c are each an integer in the range of 1 to 3,

Z, Z', and Z" are each independently oxygen, sulfur, silicon, or nitrogen, with a proviso that Z, Z', and Z" are not the same atom, $R_3$, $R_4$, and $R_5$ are each independently hydrogen; linear or branched alkyl having 1 to 20 carbon atoms; linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group containing a hetero ring; alkylaryl having 7 to 15 carbon atoms unsubstituted or substituted with alkoxy or hydrocarbon; alkylaryl substituted with a substituent group containing a hetero ring; alkynyl having 3 to 20 carbon atoms; silyl each independently substituted with linear or branched alkyl having 1 to 10 carbon atoms; silyl each independently substituted with linear or branched alkoxy having 1 to 10 carbon atoms; silyl each independently substituted with substituted or unsubstituted cycloalkyl having 3 to 12 carbon atoms; silyl each independently substituted with substituted or unsubstituted aryl having 6 to 40 carbon atoms; silyl each independently substituted with substituted or unsubstituted aryloxy having 6 to 40 carbon atoms; siloxy each independently substituted with linear or branched alkyl having 1 to 10 carbon atoms; siloxy each independently substituted with substituted or unsubstituted cycloalkyl having 3 to 12 carbon atoms; or siloxy each independently substituted with substituted or unsubstituted aryl having 6 to 40 carbon atoms; each of the substituent groups is halogen or haloalkyl having 1 to 20 carbon atoms; $R_4$ and $R_5$ may be bonded to each other to form a ring; and the hetero ring includes an aromatic or an aliphatic ring in the substituent groups containing the hetero ring,

[Cat][Ani]  [Formula 3]

wherein [Cat] is a cation and any one selected from the group consisting of hydrogen, cations of metal of Group 1, metal of Group 2, or transition metal, and an organic unit containing the cations, and

[Ani] is an anion that is slightly coordinated with metal M of Formula 1 and any one selected from the group consisting of borate, aluminate, [SbF$_6$]—, [PF$_6$]—, [AsF$_6$]—, perfluoroacetate ([CF$_3$CO$_2$]—), perfluoropropionate ([C$_2$F$_5$CO$_2$]—), perfluorobutyrate ([CF$_3$CF$_2$CF$_2$CO$_2$]—), perchlorate ([ClO$_4$]—), p-toluenesulfonate ([p-CH$_3$C$_6$H$_4$SO$_3$]—), [SO$_3$CF$_3$]—, boratabenzene, and carborane unsubstituted or substituted with halogen.

According to an embodiment of the present invention, in the method of producing a cyclic olefin polymer having a polar functional group, the bringing of the catalyst mixture into contact with the monomer solution containing cyclic olefin monomers having the polar functional group is preferably performed at 80 to 150° C.

According to another embodiment of the present invention, in the method of producing a cyclic olefin polymer having a polar functional group, the borate or aluminate of Formula 3 contains anions represented by Formula 3a or 3b:

[M'(R$_6$)$_4$]  [Formula 3a]

[M'(OR$_6$)$_4$]  [Formula 3b]

wherein M' is boron or aluminum, and

R$_6$s are each independently halogen; linear or branched alkyl having 1 to 20 carbon atoms unsubstituted or substituted with halogen; linear or branched alkenyl having 2 to 20 carbon atoms unsubstituted or substituted with halogen; cycloalkyl having 3 to 12 carbon atoms unsubstituted or substituted with halogen; aryl having 6 to 40 carbon atoms unsubstituted or substituted with hydrocarbon; aryl having 6 to 40 carbon atoms substituted with linear or branched trialkylsiloxy having 3 to 20 carbon atoms or linear or branched triarylsiloxy having 18 to 48 carbon atoms; or aralkyl having 7 to 15 carbon atoms unsubstituted or substituted with halogen.

According to another embodiment of the present invention, in the method of producing a cyclic olefin polymer having a polar functional group, each of the cyclic olefin monomers is preferably a compound represented by Formula 4:

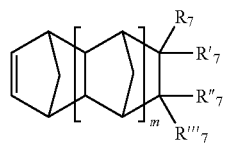

[Formula 4]

wherein m is an integer in the range of 0 to 4, at least one of R$_7$, R$_7$', R$_7$", and R$_7$'" is the polar functional group and the remaining groups are nonpolar functional groups, R$_7$, R$_7$', R$_7$", and R$_7$'" are the same as or different from each other, and each independently hydrogen; halogen; linear or branched alkyl that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a polar functional group that contains at least one of oxygen, nitrogen, phosphorus, sulfur, silicon, and boron, R$_7$ and R$_7$' or R$_7$" and R$_7$'" may be bonded to each other to form an alkylidene group having 1 to 10 carbon atoms or R$_7$ or R$_7$' may be bonded to any one of R$_7$" and R$_7$'" to form a saturated or unsaturated aliphatic ring having 4 to 12 carbon atoms or an aromatic ring having 6 to 24 carbon atoms, the polar functional group is —R$_8$OR$_9$, —OR$_9$, —OC(O)OR$_9$, —R$_8$OC(O)OR$_9$, —C(O)OR$_9$, —R$_8$C(O)OR$_9$, —C(O)R$_9$, —R$_8$C(O)R$_9$, —OC(O)R$_9$, —R$_8$OC(O)R$_9$, —(R$_8$O)$_n$—OR$_9$, —(OR$_8$)$_n$—OR$_9$, —C(O)—O—C(O)R$_9$, —R$_8$C(O)—O—C(O)R$_9$, —SR$_9$, —R$_8$SR$_9$, —SSR$_9$, —R$_8$SSR$_9$, —S(=O)R$_9$, —R$_8$S(=O)R$_9$, —R$_8$C(=S)R$_9$—, —R$_8$C(=S)SR$_9$, —R$_8$SO$_3$R$_9$, —SO$_3$R$_9$, —R$_8$N=C=S, —N=C=S, —NCO, —R$_8$—NCO, —CN, —R$_8$CN, —NNC(=S)R$_9$, —

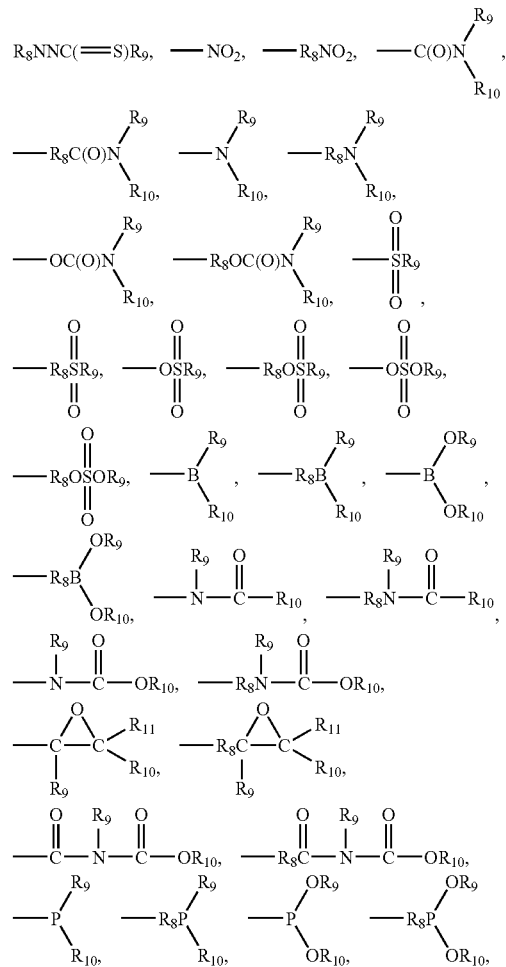

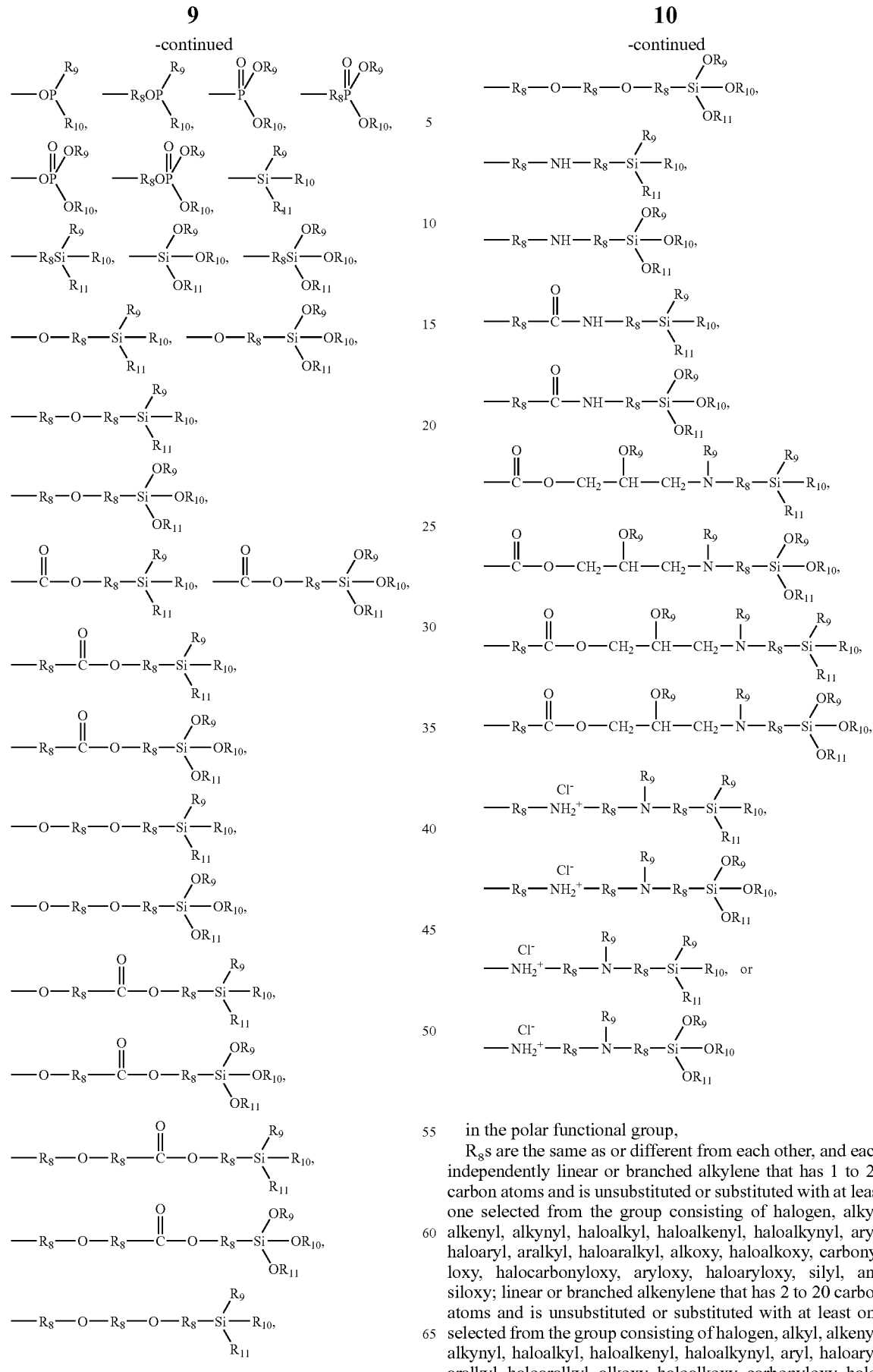

in the polar functional group, $R_8$s are the same as or different from each other, and each independently linear or branched alkylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenylene that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynylene that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkylene that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; arylene that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, $R_9$, $R_{10}$, and $R_{11}$ are the same as or different from each other, and each independently hydrogen; halogen; linear or branched alkyl that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxy that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxy that has 1 to 20 carbon atoms and is unsubstituted or substituted with at least one selected from the group consisting of halogen, alkyl, alkenyl, alkynyl haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, and n's are each independently an integer in the range of 1 to 10.

According to another embodiment of the present invention, in the method of producing a cyclic olefin polymer having a polar functional group, the precatalyst represented by Formula 1 and the organophosphorus ligand represented by Formula 2 are a precatalyst represented by Formula 5 and an organophosphorus ligand represented by Formula 6, respectively:

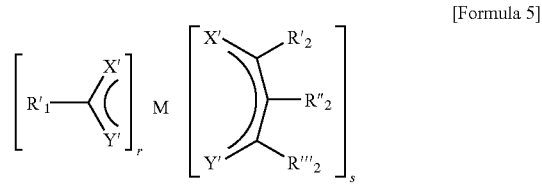

[Formula 5]

wherein X' and Y' are each independently a hetero atom that is selected from the group consisting of S and O, $R_1'$, $R_2'$, $R_2''$, and $R_2'''$ are each independently linear or branched alkyl having 1 to 20 carbon atoms; linear or branched alkenyl having 2 to 20 carbon atoms; linear or branched vinyl having 2 to 20 carbon atoms; cycloalkyl having 5 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms, M is metal of Group 10;

r and s are each independently 0 to 2, and r+s=2,

$[(R_3)_2N]—P[O(R_4)][O(R_5)]$ [Formula 6]

wherein $R_3$, $R_4$, and $R_5$ have the same definition as those of Formula 2.

According to another embodiment of the present invention, in the method of producing a cyclic olefin polymer having a polar functional group, the precatalyst represented by Formula 1 and the organophosphorus ligand represented by Formula 2 are a precatalyst containing Pd metal represented by Formula 7 and an organophosphorus ligand represented by Formula 8, respectively:

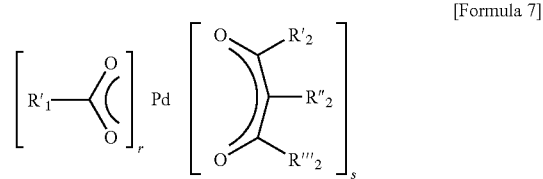

[Formula 7]

wherein $R_1'$, $R_2'$, $R_2''$, and $R_2'''$ have the same definition as those of Formula 5, and r and s are each independently 0 to 2, and r+s=2,

$[(R_{23})_2N][O(R_{24})]_2$ [Formula 8]

wherein $R_{23}$ and $R_{24}$ are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with hydrocarbon; alkylaryl unsubstituted or substituted with alkoxy or hydrocarbon; alkylaryl substituted with a substituent group containing an aliphatic hetero ring; or alkynyl having 3 to 20 carbon atoms; and two $R_{24}$s may be bonded to each other to form a ring.

According to another embodiment of the present invention, in the method of producing a cyclic olefin polymer having a polar functional group, the organophosphorus ligand represented by Formula 2 is preferably an organophosphorus ligand represented by Formula 9:

[Formula 9]

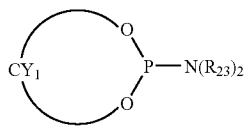

wherein $CY_1$ is a substituted or unsubstituted ring that contains two O atoms and one P atom, and $R_{23}$s are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms.

In Formula 9, examples of the substituent group that is capable of being substituted with $CY_1$ may include linear or branched alkyl having 1 to 20 carbon atoms, linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group having a hetero ring; alkylaryl having 7 to 15 carbon atoms unsubstituted or substituted with alkoxy or hydrocarbon; alkylaryl substituted with a substituent group having a hetero ring; or alkynyl having 3 to 20 carbon atoms.

According to another embodiment of the present invention, in the method of producing a cyclic olefin polymer having a polar functional group, the organophosphorus ligand represented by Formula 2 is preferably any one selected from the organophosphorus ligands represented by Formulae 10 to 14:

[Formula 10]

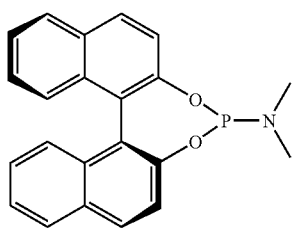

[Formula 11]

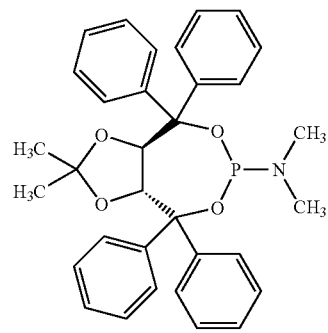

[Formula 12]

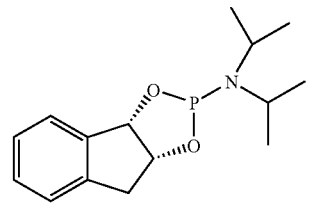

[Formula 13]

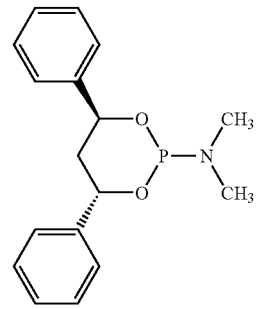

[Formula 14]

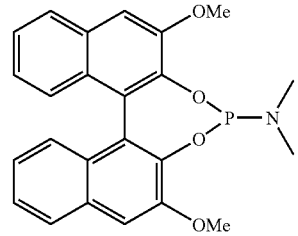

According to another embodiment of the present invention, in the method of producing a cyclic olefin polymer having a polar functional group, in the precatalyst represented by Formula 1, the metal is Pd, p is 2, the ligand containing the hetero atom directly coordinated with the metal is acetylacetonate or acetate, the organophosphorus ligand represented by Formula 2 is (3,5-dioxa-4-phospha-cyclohepta[2,1-a;3,4-a']dinaphthalen-4-yl)dimethylamine represented by Formula 10, and [Cat] is N,N-dimethylphenyl ammonium and [Ani] is preferably tetrakis(pentafluorophenyl)borate in a cocatalyst represented by Formula 3:

[Formula 10]

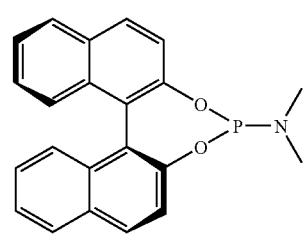

According to another embodiment of the present invention, in the method of producing a cyclic olefin polymer having a polar functional group, the content of the organophosphorus ligand is preferably 0.5 to 10 mole based on 1 mole of the precatalyst.

According to another embodiment of the present invention, in the method of producing a cyclic olefin polymer having a polar functional group, the content of the cocatalyst is preferably 0.5 to 10 mole based on 1 mole of the precatalyst.

According to another embodiment of the present invention, in the method of producing a cyclic olefin polymer having a polar functional group, the catalyst mixture is preferably carried in a particulate support.

According to another embodiment of the present invention, in the method of producing a cyclic olefin polymer having a polar functional group, the particulate support is preferably one or more selected from the group consisting of silica, titania, silica/chromia, silica/chromia/titania, silica/alumina, aluminum phosphate gel, silanized silica, silica hydro gel, montmorillonite clay, and zeolite.

According to another embodiment of the present invention, in the method of producing a cyclic olefin polymer having a polar functional group, an organic solvent where the catalyst mixture is dissolved is preferably any one selected from the group consisting of dichloromethane, dichloroethane, toluene, chlorobenzene, and a mixture thereof.

According to another embodiment of the present invention, in the method of producing a cyclic olefin polymer having a polar functional group, a total amount of an organic solvent of a reaction system is preferably 50 to 800% based on a total weight of the monomers in the monomer solution.

According to another embodiment of the present invention, in the method of producing a cyclic olefin polymer having a polar functional group, the catalyst mixture preferably includes a metal catalyst complex that contains the precatalyst, the organophosphorus ligand, and the cocatalyst.

According to another embodiment of the present invention, in the method of producing a cyclic olefin polymer having a polar functional group, the catalyst mixture is preferably added to the monomer solution in a solid phase.

According to another embodiment of the present invention, in the method of producing a cyclic olefin polymer having a polar functional group, the catalyst mixture is added to a reaction system so that a molar ratio of the precatalyst to a total mole number of the monomers in the monomer solution is preferably 1/400 to 1/200,000.

According to another embodiment of the present invention, in the method of producing a cyclic olefin polymer having a polar functional group, the monomer solution preferably further contains a cyclic olefin compound having no polar functional group.

According to another embodiment of the present invention, in the method of producing a cyclic olefin polymer having a polar functional group, the cyclic olefin polymer having the polar functional group preferably includes a cyclic olefin homopolymer having a polar functional group, a copolymer of cyclic olefin monomers having different polar functional groups, or a copolymer of the cyclic olefin monomers having the polar functional groups and the cyclic olefin monomers having no polar functional group.

According to another embodiment of the present invention, in the method of producing a cyclic olefin polymer having a polar functional group, a weight average molecular weight (Mw) of the cyclic olefin polymer having the polar functional group is preferably 10,000 to 1,000,000.

According to another embodiment of the present invention, in the method of producing a cyclic olefin polymer having a polar functional group, the monomer solution preferably further comprises linear or branched olefin having 1 to 20 carbon atoms.

In order to achieve the second object, the present invention provides a cyclic olefin polymer having a polar functional group, which is produced by using the method according to the above-mentioned method, wherein the polymer is an addition polymer of cyclic olefin monomers each having a polar functional group represented by Formula 4 and has a weight average molecular weight (Mw) of 10,000 to 1,000,000:

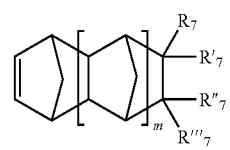

[Formula 4]

wherein m, $R_7$, $R_7'$, $R_7''$, and $R_7'''$ are as described above.

In order to achieve the third object, the present invention provides an optical anisotropic film including the cyclic olefin polymer having the polar functional group.

According to an embodiment of the present invention, in the optical anisotropic film, a thickness direction retardation value ($R_{th}$) of the film represented by Equation 1 is preferably 70 to 1,000 nm. For reference, an in-plane retardation value ($R_e$) is defined by the following Equation 2:

$$R_{th} = \Delta(n_y - n_z) \times d \quad \text{[Equation 1]}$$

$$R_e = \Delta(n_x - n_y) \times d \quad \text{[Equation 2]}$$

wherein $n_x$ is an in-plane refraction index of a slow axis measured at wavelength 550 nm, $n_y$ is refraction index of a fast axis measured at a wavelength of 550 nm, $n_z$ is a thickness refraction index measured at the wavelength of 550 nm, and d is a thickness of the film.

According to another embodiment of the present invention, the optical anisotropic film is preferably a negative C-plate type optical compensation film for liquid crystal displays satisfying a refraction index correlation where $n_x \approx n_y \geq n_z$ ($n_x$ is an in-plane refraction index of a slow axis, $n_y$ is the refraction index of the fast axis, and $n_z$ is the thickness refraction index).

In order to achieve the fourth object, the present invention provides a catalyst composition for producing a cyclic olefin polymer having a polar functional group. The catalyst composition includes a precatalyst containing metal of Group 10, which is represented by Formula 1 and includes a ligand containing a hetero atom directly coordinated with the metal; an organophosphorus ligand represented by Formula 2; and a cocatalyst that is a salt compound slightly coordinated with the metal of Group 10 represented by Formula 3 and providing an anion,

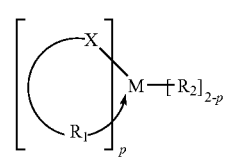

[Formula 1]

wherein X, $R_1$, $R_2$, M, and p are as described above, $$[Z(R_3)_a] - P[Z'(R_4)_b][Z''(R_5)_c] \quad \text{[Formula 2]}$$

wherein a, b, c, Z, Z', Z'', $R_3$, $R_4$, and $R_5$ are as described above,

[Cat][Ani]   [Formula 3]

wherein [Cat] and [Ani] are as described above.

According to an embodiment of the present invention, in the catalyst composition for producing a cyclic olefin polymer having a polar functional group, the borate or aluminate of Formula 3 preferably contains anions represented by Formula 3a or 3b:

[M'($R_6$)$_4$]   [Formula 3a]

[M'(O$R_6$)$_4$]   [Formula 3b]

wherein M' and $R_6$ are as described above.

According to another embodiment of the present invention, in the catalyst composition for producing a cyclic olefin polymer having a polar functional group, the precatalyst represented by Formula 1 and the organophosphorus ligand represented by Formula 2 are preferably a precatalyst represented by Formula 5 and an organophosphorus ligand represented by Formula 6, respectively:

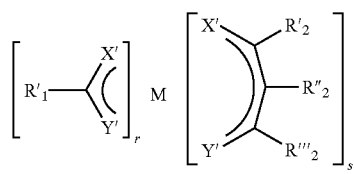

[Formula 5]

wherein X', Y', $R_1'$, $R_2''$, $R_2'''$, M, r, and s are as described above,

[($R_3$)$_2$N]—P[O($R_4$)][O($R_5$)]   [Formula 6]

wherein $R_3$, $R_4$, and $R_5$ are as described above.

According to another embodiment of the present invention, in the catalyst composition for producing a cyclic olefin polymer having a polar functional group, the precatalyst represented by Formula 1 and the organophosphorus ligand represented by Formula 2 are a precatalyst containing Pd metal represented by Formula 7 and an organophosphorus ligand represented by Formula 8, respectively:

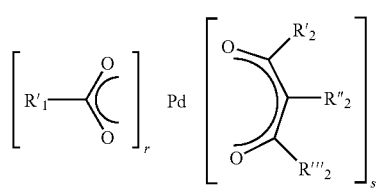

[Formula 7]

wherein $R_1'$, $R_2'$, $R_2''$, and $R_2'''$ are as described above, r and s are each independently 0 to 2, and r+s=2,

[($R_{23}$)$_2$N]—P[O($R_{24}$)]$_2$   [Formula 8]

wherein $R_{23}$ and $R_{24}$ are as described above.

According to another embodiment of the present invention, in the catalyst composition for producing a cyclic olefin polymer having a polar functional group, the organophosphorus ligand represented by Formula 2 is preferably an organophosphorus ligand represented by Formula 9:

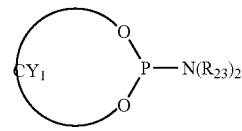

[Formula 9]

wherein $CY_1$ is a substituted or unsubstituted ring that contains two O atoms and one P atom, and $R_{23}$s are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms.

In Formula 9, examples of the substituent group that is capable of being substituted with $CY_1$ may include linear or branched alkyl having 1 to 20 carbon atoms, linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group having a hetero ring; alkylaryl having 7 to 15 carbon atoms unsubstituted or substituted with alkoxy or hydrocarbon; alkylaryl substituted with a substituent group having a hetero ring; or alkynyl having 3 to 20 carbon atoms.

According to another embodiment of the present invention, in the catalyst composition for producing a cyclic olefin polymer having a polar functional group, the organophosphorus ligand represented by Formula 2 is preferably any one selected from the compounds represented by Formulae 10 to 14:

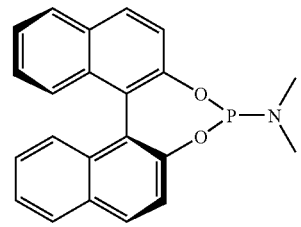

[Formula 10]

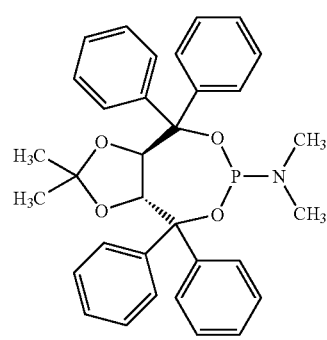

[Formula 11]

[Formula 12]

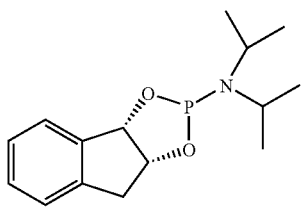

[Formula 13]

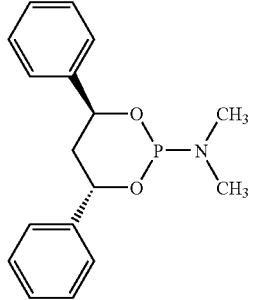

[Formula 14]

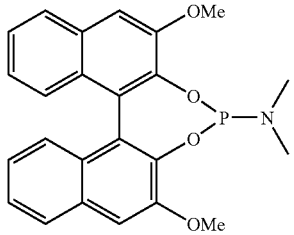

According to another embodiment of the present invention, in the catalyst composition for producing a cyclic olefin polymer having a polar functional group, in the precatalyst represented by Formula 1, the metal is Pd, p is 2, the ligand containing the hetero atom directly coordinated with the metal is acetylacetonate or acetate, the organophosphorus ligand represented by Formula 2 is preferably (3,5-dioxa-4-phospha-cyclohepta[2,1-a; 3,4-a']dinaphthalen-4-yl)dimethylamine represented by Formula 10, and [Cat] is N,N-dimethylphenyl ammonium and [Ani] is preferably tetrakis(pentafluorophenyl)borate in a first cocatalyst represented by Formula 3.

[Formula 10]

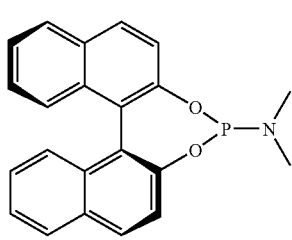

Advantageous Effects

According to an olefin polymerization method and a catalyst composition for polymerization of the present invention, since deactivation of the catalyst due to polar functional groups of monomers is capable of being suppressed, it is possible to produce polyolefins having a high molecular weight at high polymerization yield during polyolefin polymerization. Furthermore, cyclic olefins having the polar functional groups have excellent polymerization reactivity and activity of the catalyst composition is maintained under a variable polymerization condition. Accordingly, the present invention is very useful to a mass-production process.

Best Mode

A detailed description of the present invention will be given hereinafter. In a method of producing a cyclic olefin polymer having a polar functional group according to the present invention, deactivation of a catalyst due to polar functional groups of monomers, water, and oxygen is prevented, the activity of the catalyst is excellent, and stability thereof is high. Therefore, it is possible to produce a polymer having a high molecular weight at high yield and reduce the amount of catalyst to the monomers. Thus, it is unnecessary to additionally perform a process of removing the catalyst residue.

In Formula 1, the arrow denotes coordination of a ligand with metal.

The present invention provides a method of producing a cyclic olefin polymer having a polar functional group. The method includes bringing a catalyst mixture into contact with a monomer solution containing cyclic olefin monomers having a polar functional group. The catalyst mixture includes a precatalyst containing metal of Group 10 represented by Formula 1, an organophosphorus ligand represented by Formula 2, and a cocatalyst that is a salt compound slightly coordinated with the metal of Group 10 represented by Formula 3 and providing an anion:

[Formula 1]

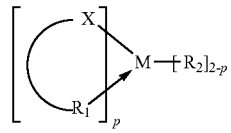

wherein Xs are each independently a hetero atom selected from S, O, and N, $R_1$s are each independently —CH=CHR$^{20}$, —OR$^{20}$, —SR$^{20}$, —N(R$^{20}$)$_2$, —N=NR$^{20}$, —P(R$^{20}$)$_2$, —C(O)R$^{20}$, —C(R$^{20}$)=NR$^{20}$, —C(O)OR$^{20}$, —OC(O)OR$^{20}$, —OC(O)R$^{20}$, —C(R$^{20}$)=CHC(O)R$^{20}$, —R$^{21}$C(O)R$^{20}$, —R$^{21}$C(O)OR$^{20}$, or —R$^{21}$OC(O)R$^{20}$; R$^{20}$s are each independently hydrogen, halogen, linear or branched alkyl having 1 to 5 carbon atoms, linear or branched haloalkyl having 1 to 5 carbon atoms, cycloalkyl having 5 to 10 carbon atoms, linear or branched alkenyl having 2 to 5 carbon atoms, linear or branched haloalkenyl having 2 to 5 carbon atoms, or substituted or unsubstituted aralkyl having 7 to 24 carbon atoms; R$^{21}$ is hydrocarbylene having 1 to 20 carbon atoms, $R_2$s are each independently linear or branched alkyl having 1 to 20 carbon atoms, linear or branched alkenyl having 2 to 20 carbon atoms, linear or branched vinyl having 2 to 20 carbon atoms, cycloalkyl having 5 to 12 carbon atoms unsubstituted or substituted with hydrocarbon, aryl having 6 to 40 carbon atoms unsubstituted or substituted with hydrocarbon, aralkyl having 7 to 15 carbon atoms unsubstituted or substituted with hydrocarbon, or alkynyl having 3 to 20 carbon atoms, M is metal of Group 10, and p is 0 to 2, $[Z(R_3)_a]$—$P[Z'(R_4)_b][Z''(R_5)_c]$ [Formula 2]

wherein a, b, and c are each an integer in the range of 1 to 3,

Z, Z', and Z" are each independently oxygen, sulfur, silicon, or nitrogen, with a proviso that Z, Z', and Z" are not the same atom, R$_3$, R$_4$, and R$_5$ are each independently hydrogen; linear or branched alkyl having 1 to 20 carbon atoms; linear or branched alkoxy having 1 to 20 carbon atoms; linear or branched ally having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group containing a hetero ring; alkylaryl having 7 to 15 carbon atoms unsubstituted or substituted with alkoxy or hydrocarbon; alkylaryl substituted with a substituent group containing a hetero ring; alkynyl having 3 to 20 carbon atoms; silyl each independently substituted with linear or branched alkyl having 1 to 10 carbon atoms; silyl each independently substituted with linear or branched alkoxy having 1 to 10 carbon atoms; silyl each independently substituted with substituted or unsubstituted cycloalkyl having 3 to 12 carbon atoms; silyl each independently substituted with substituted or unsubstituted aryl having 6 to 40 carbon atoms; silyl each independently substituted with substituted or unsubstituted aryloxy having 6 to 40 carbon atoms; siloxy each independently substituted with linear or branched alkyl having 1 to 10 carbon atoms; siloxy each independently substituted with substituted or unsubstituted cycloalkyl having 3 to 12 carbon atoms; or siloxy each independently substituted with substituted or unsubstituted aryl having 6 to 40 carbon atoms; each of the substituent groups is halogen or haloalkyl having 1 to 20 carbon atoms; R$_4$ and R$_5$ may be bonded to each other to form a ring; and the hetero ring includes an aromatic or an aliphatic ring in the substituent groups containing the hetero ring,

[Cat][Ani]    [Formula 3]

wherein [Cat] is a cation and any one selected from the group consisting of hydrogen, cations of metal of Group 1, metal of Group 2, or transition metal, and an organic unit containing the cations.

To be more specific, preferably, examples of the cation of the metal of Group 1 include lithium, sodium, potassium, rubidium, or cesium ions. Particularly, it is more preferable to use lithium, sodium, or potassium ions. Preferably, examples of the cation of the metal of Group 2 include beryllium, magnesium, calcium, strontium, or barium ions. Particularly, it is more preferable to use magnesium, calcium, strontium, or barium ions. Preferably, examples of the cation of the transition metal include zinc, silver, or thallium ions. Preferably, examples of the organic unit containing the cation include ammonium, phosphonium, carbonium, or teryllium cations.

Preferable examples of the organic unit containing the cation include [NHR$^{15}_3$]$^+$, [NR$^{15}_3$]$^+$, [PHR$^{15}_3$]$^+$, [PR$^{15}_3$]$^+$, [CR$^{15}_3$]$^+$, and [SiR$^{15}_3$]$^+$. In connection with this, R$^{15}$s are each independently a hydrocarbyl group, a silylhydrocarbyl group, or a perfluorocarbyl group, and include 1 to 24 carbon atoms connected in a linear, branched, or cyclic form, and more preferably 1 to 12 carbon atoms connected in a linear, branched, or cyclic form. In the organic unit containing the cation, R$^{15}$s may be the same as or different from each other.

The perfluorocarbyl group means a functional group in which all hydrogen atoms bonded to carbon are substituted with fluorine atoms. The hydrocarbyl group has the same meaning as the hydrocarbon. The silylhydrocarbyl group means a functional group in which the silyl group is bonded to the hydrocarbon group.

Examples of the hydrocarbyl group or the hydrocarbon group include, but are not limited to linear or branched alkyl having 1 to 20 carbon atoms; cycloalkyl having 3 to 20 carbon atoms; linear or branched alkenyl having 2 to 20 carbon atoms; cycloalkenyl having 3 to 20 carbon atoms; aryl having 6 to 24 carbon atoms; or arylalkyl having 7 to 24 carbon atoms. Any substituent group that is capable of being used in the related art may be used as the hydrocarbyl group or the hydrocarbon group.

[Ani] is an anion that is slightly coordinated with metal M of Formula 1 and any one selected from the group consisting of borate, aluminate, [SbF$_6$]—, [PF$_6$]—, [AsF$_6$]—, perfluoroacetate ([CF$_3$CO$_2$]—), perfluoropropionate [C$_2$F$_5$CO$_2$]—), perfluorobutyrate ([CF$_3$CF$_2$CF$_2$CO$_2$]—), perchlorate ([ClO$_4$]—), p-toluenesulfonate ([p-CH$_3$C$_6$H$_4$SO$_3$]—), [SO$_3$CF$_3$]—, boratabenzene, and carborane unsubstituted or substituted with halogen.

In the production method, the precatalyst has high stability to the monomers, water, and oxygen having the predetermined polar reaction group, and the organophosphorus ligand and the cocatalyst are reacted with the precatalyst of the metal of Group 10 so that the precatalyst is activated to be converted into a cation type catalyst. The organophosphorus ligand stabilizes the cation type catalyst to prevent deactivation of the catalyst due to the polar group of the polar monomers, water, and oxygen.

According to an embodiment of the present invention, in the method of producing the cyclic olefin polymer having the polar functional group, it is preferable that the bringing of the catalyst mixture into contact with the monomer solution containing cyclic olefin monomers having the polar functional group be performed at 80 to 150° C.

The setting of the reaction temperature will be described in detail below. In the case of a typical organometallic polymerization catalyst, if a polymerization temperature is increased, a polymerization yield is increased, but a molecular weight of a polymer is reduced or a catalyst is thermally decomposed to remove polymerization activity (Kaminsky et al. Angew. Chem. Int. Ed., 1985, vol 24, 507; Brookhart et al. Chem. Rev. 2000, vol 100, 1169; Resconi et al. Chem. Rev. 2000, vol 100, 1253). The reason why the molecular weight is reduced due to an increase in polymerization temperature is that hydrogen moves from a β-position of the polymer bonded to the catalyst to the catalyst to separate polymer chains from the catalyst.

Meanwhile, a polar functional group of a norbornene monomer interacts with a cation type catalyst at normal temperature to cover catalyst active sites to which double bonds of norbornene are bonded, thus reducing a polymerization yield and a molecular weight. However, if a polymerization temperature is increased, hydrogen that is provided at a β-position of a norbornene polymer bonded to the catalyst is difficult to form a stereostructure that is capable of interacting the catalyst due to characteristics of the norbornene monomer. Furthermore, since it is difficult to move β-hydrogen to the catalyst, the molecular weight is increased (Kaminsky et al. Macromol. Symp. 1995, vol 97, 225). Accordingly, the polymerization temperature needs to be increased. However, if the polymerization temperature is increased to 80° C. or more, most of catalysts that are used to produce the known norbornene polymer having the polar functional group are thermally decomposed, accordingly, activity thereof is reduced. Hence, it is impossible to obtain a polymer having a high molecular weight. However, the catalyst used in the present invention is thermally stable at 80° C. or more, so that the catalyst is not decomposed at that temperature. Therefore, interaction of the polar functional group of the norbornene monomer and the cation type catalyst is prevented at high temperatures, resulting in formation or recovery of the catalyst active sites. Hence, it is possible to produce a cyclic olefin polymer which has a high molecular weight and includes a polar functional group at high yield. Meanwhile, when the polymerization temperature is higher than 150° C., the catalyst component is thermally decomposed to have low activity. Thus, it is difficult to produce the cyclic olefin polymer which has the high molecular weight and includes the polar functional group.

In addition, among the components constituting the catalyst used in the present invention, the organophosphorus ligand has excellent stability even though the polar functional group, water, oxygen, and the other impurities are present. Accordingly, unlike known organophosphorus ligands (e.g.: trialkyl phosphine compound) each having excellent activity only in an air-free atmosphere in situ, it is possible to store the ligand in a solution over a long period of time, it is unnecessary to purify a solvent, and the activity thereof is maintained even though the ligand is exposed to air. Therefore, the production method of the present invention is capable of being extensively applied to various types of production environments. This is very important to perform mass production.

That is, in the production method of the present invention, the catalyst mixture which includes the precatalyst containing metal of Group 10 represented by Formula 1, the organophosphorus ligand represented by Formula 2, and the cocatalyst that is the salt compound represented by Formula 3 comes into contact with the monomer solution containing cyclic olefin monomers having the polar functional group at 80 to 150° C. The catalyst mixture is not thermally decomposed, and has high stability and activity even though the catalyst mixture is exposed to the polar functional group, water, and oxygen.

In the production method according to the present invention, preferably, borate or aluminate of Formula 3 contains anions represented by Formula 3a or 3b:

 [Formula 3a]

 [Formula 3b]

wherein M' is boron or aluminum, and $R_6$s are each independently halogen; linear or branched alkyl having 1 to 20 carbon atoms unsubstituted or substituted with halogen; linear or branched alkenyl having 2 to 20 carbon atoms unsubstituted or substituted with halogen; cycloalkyl having 3 to 12 carbon atoms unsubstituted or substituted with halogen; aryl having 6 to 40 carbon atoms unsubstituted or substituted with hydrocarbon; aryl having 6 to 40 carbon atoms substituted with linear or branched trialkylsiloxy having 3 to 20 carbon atoms or linear or branched triarylsiloxy having 18 to 48 carbon atoms; or aralkyl having 7 to 15 carbon atoms unsubstituted or substituted with halogen.

In the production method according to the present invention, preferably, the cyclic olefin monomer is a compound represented by Formula 4:

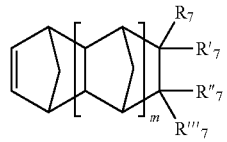 [Formula 4]

wherein m is an integer in the range of 0 to 4, at least one of $R_7$, $R_7'$, $R_7''$, and $R_7'''$ is the polar functional group and the remaining groups are nonpolar functional groups, $R_7$, $R_7'$, $R_7''$, and $R_7'''$ are the same as or different from each other, and each independently hydrogen; halogen; linear or branched alkyl that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a polar functional group that contains at least one of oxygen, nitrogen, phosphorus, sulfur, silicon, and boron, $R_7$ and $R_7'$ or $R_7''$ and $R_7'''$ may be bonded to each other to form an alkylidene group having 1 to 10 carbon atoms or $R_7$ or $R_7'$ may be bonded to any one of $R_7''$ and $R_7'''$ to form a saturated or unsaturated aliphatic ring having 4 to 12 carbon atoms or an aromatic ring having 6 to 24 carbon atoms, the polar functional group is —$R_8OR_9$, —$OR_9$, —$OC(O)OR_9$, —$R_5OC(O)OR_9$, —$C(O)OR_9$, —$R_8C(O)OR_9$, —$C(O)R_9$, —$R_8C(O)R_9$, —$OC(O)R_9$, —$R_8OC(O)R_9$, —$(R_8O)_n$—$OR_9$, —$(OR_8)_n$—$OR_9$, —$C(O)$—$O$—$C(O)R_9$, —$R_8C(O)$—$O$—$C(O)R_9$, —$SR_9$, —$R_8SR_9$, —$SSR_9$, —$R_8SSR_9$, —$S(=O)R_9$, —$R_8S(=O)R_9$, —$R_8C(=S)R_9$—, —$R_8C(=S)SR_9$, —$R_8SO_3R_9$, —$SO_3R_9$, —$R_8N=C=S$, —$N=C=S$, —$NCO$, —$R_8$—$NCO$, —$CN$, —$R_8CN$, —$NNC(=S)R_9$, —

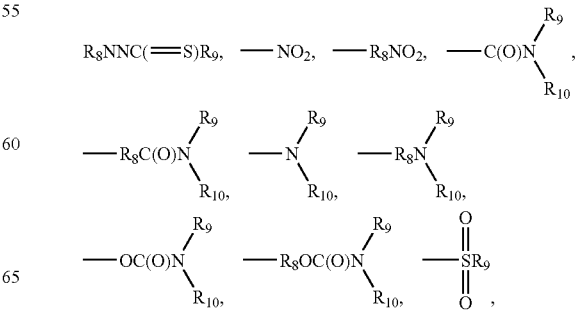

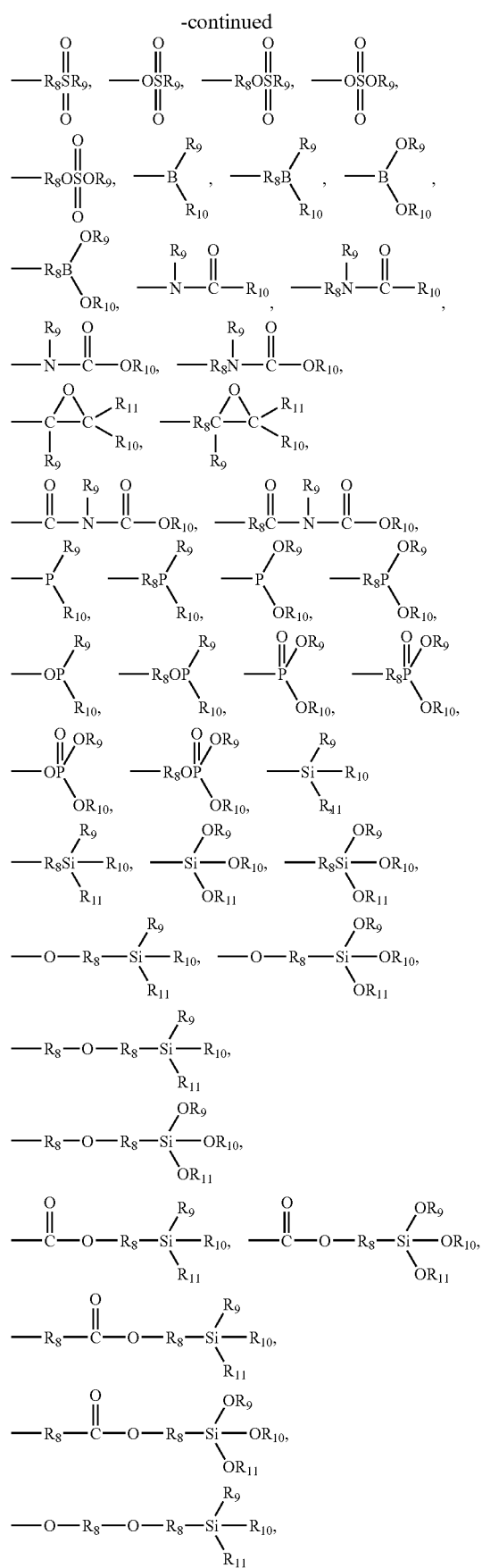
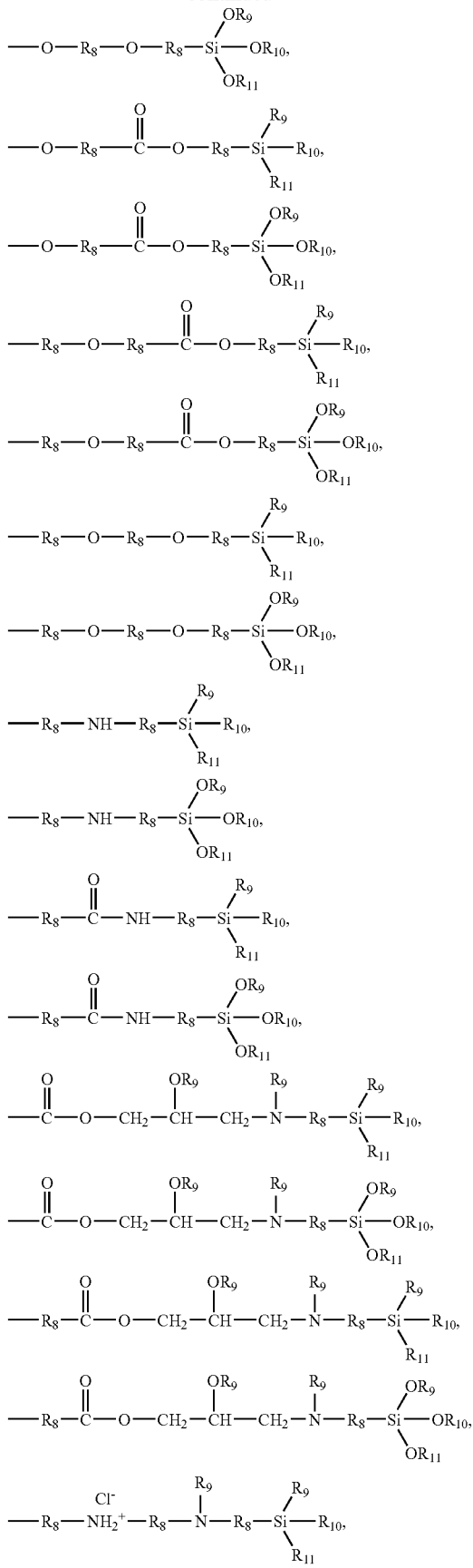

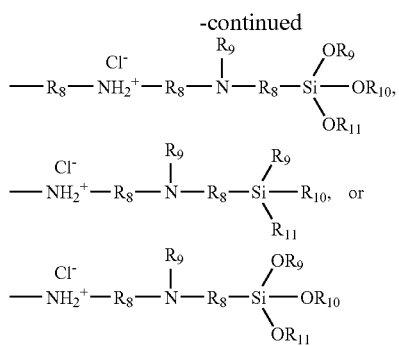

in the polar functional group, $R_8$s are the same as or different from each other, and each independently linear or branched alkylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenylene that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynylene that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkylene that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; arylene that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, $R_9$, $R_{10}$, and $R_{11}$ are the same as or different from each other, and each independently hydrogen; halogen; linear or branched alkyl that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl alkoxy, haloalkoxy, carbonyloxy, halocarbonyloxy, aryloxy, haloaryloxy, silyl, and siloxy; aryl that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxy that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxy that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, and n's are each independently an integer in the range of 1 to 10.

In the production method according to the present invention, preferably, the precatalyst represented by Formula 1 and the organophosphorus ligand represented by Formula 2 are a precatalyst represented by Formula 5 and an organophosphorus ligand represented by Formula 6, respectively:

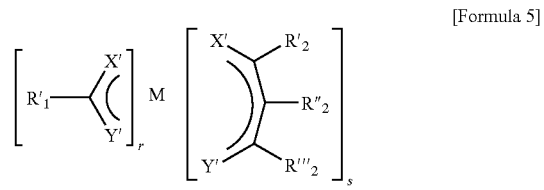

[Formula 5]

wherein X' and Y' are each independently a hetero atom that is selected from the group consisting of S and 0, $R_1'$, $R_2'$, $R_2''$, and $R_2'''$ are each independently linear or branched alkyl having 1 to 20 carbon atoms; linear or branched alkenyl having 2 to 20 carbon atoms; linear or branched vinyl having 2 to 20 carbon atoms; cycloalkyl having 5 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms, M is metal of Group 10;

r and s are each independently 0 to 2, and r+s=2, $$[(R_3)_2N]-P[O(R_4)][O(R_5)]$$ [Formula 6]

wherein $R_3$, $R_4$, and $R_5$ are the same as those of Formula 2.

Furthermore, in the production method according to the present invention, preferably, the precatalyst represented by Formula 1 and the organophosphorus ligand represented by Formula 2 are a precatalyst containing Pd metal represented by Formula 7 and an organophosphorus ligand represented by Formula 8, respectively:

[Formula 7]

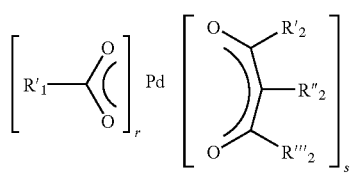

wherein $R_1'$, $R_2'$, $R_2''$, and $R_2'''$ are as described above, r and s are each independently 0 to 2, and r+s=2, $$[(R_{23})_2N]\text{---}P[O(R_{24})]_2$$ [Formula 8]

wherein $R_{23}$ and $R_{24}$ are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with hydrocarbon; alkylaryl unsubstituted or substituted with alkoxy or hydrocarbon; alkylaryl substituted with a substituent group containing an aliphatic hetero ring; or alkynyl having 3 to 20 carbon atoms; and two $R_{24}$s may be bonded to each other to form a ring.

In the method of producing the cyclic olefin polymer having the polar functional group, in the case of when the two $R_{24}$s are be bonded to each other to form a ring, the compound of Formula 8 may be represented by Formula 9:

[Formula 9]

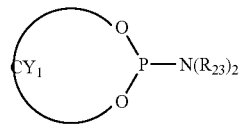

wherein $CY_1$ is a substituted or unsubstituted ring that contains two O atoms and one P atom, and $R_{23}$s are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms.

In Formula 9, examples of the substituent group that is capable of being substituted with $CY_1$ may include linear or branched alkyl having 1 to 20 carbon atoms, linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group having a hetero ring; alkylaryl having 7 to 15 carbon atoms unsubstituted or substituted with alkoxy or hydrocarbon; alkylaryl substituted with a substituent group having a hetero ring; or alkynyl having 3 to 20 carbon atoms.

To be more specific, in the method of producing the cyclic olefin polymer having the polar functional group, preferable examples of the organophosphorus ligand represented by Formula 2 include, but are not limited to the compounds represented by Formulae 10 to 14.

[Formula 10]

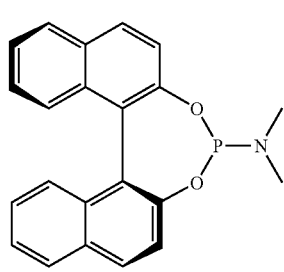

[Formula 11]

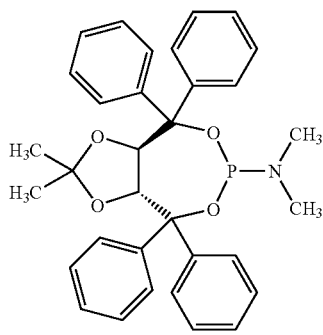

[Formula 12]

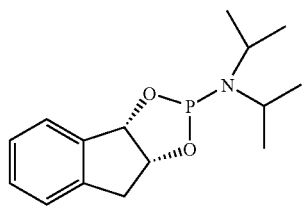

[Formula 13]

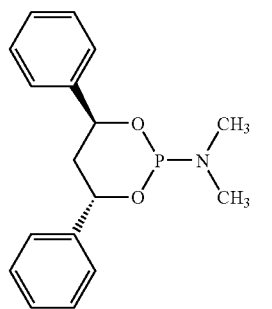

[Formula 14]

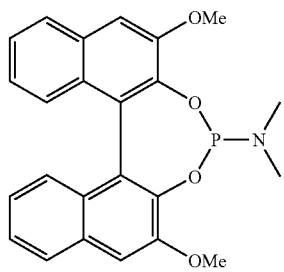

Additionally, in the production method according to the present invention, in the precatalyst represented by Formula 1, preferably, the metal is Pd, p is 2, the ligand containing the hetero atom directly coordinated with the metal is acetylacetonate or acetate, the ligand represented by Formula 2 is (3,5-dioxa-4-phospha-cyclohepta[2,1-a;3,4-a']dinaphthalen-4-yl)dimethylamine represented by Formula 10, and [Cat] is N,N-dimethylphenyl ammonium and [Ani] is tetrakis(pentafluorophenyl)borate in a first cocatalyst represented by Formula 3.

[Formula 10]

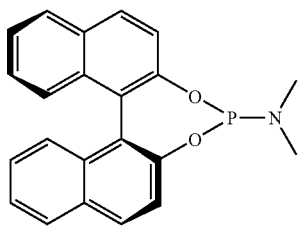

The organophosphorus ligand that is used during the production method according to the present invention has electronic stability and functions to thermally and chemically activate the transition metal compound. The content of the organophosphorus ligand may be 0.5 to 10 mole based on 1 mole of the precatalyst that contains the transition metal of Group 10 used in the method of producing the cyclic olefin polymer having the polar functional group according to the present invention. In the case of when the mole number of the organophosphorus ligand is less than 0.5 mole, the activity of the precatalyst is poor. In the case of when the mole number is more than 10 mole, since the molecular weight is reduced, the case is undesirable.

In the production method according to the present invention, a salt compound that is used as the cocatalyst has an ability which is capable of activating the precatalyst so that the precatalyst acts as a cation type catalyst. The content of the cocatalyst may be 0.5 to 10 mole based on 1 mole of the precatalyst that contains the transition metal of Group 10 used in the method of producing the cyclic olefin polymer having the polar functional group according to the present invention. In the case of when the mole number of the cocatalyst is less than 0.5 mole, the activity of the precatalyst is poor. In the case of when the mole number is more than 10 mole, since the polymer is discolored, the case is undesirable.

The catalyst mixture that contains the precatalyst, the organophosphorus ligand, and the cocatalyst according to the present invention may be used while being carried in a particulate support, and the particulate support may be silica, titania, silica/chromia, silica/chromia/titania, silica/alumina, aluminum phosphate gel, silanized silica, silica hydro gel, montmorillonite clay, or zeolite. In the case of when the catalyst mixture is used while being carried on the particulate support, there are advantages in that a molecular weight distribution may be controlled according to the purpose and an apparent density of the obtained polymer may be improved.

The catalyst mixture used in the present invention may be directly added to solids without a solvent or added after they are mixed with each other in a solvent to produce an activated catalyst solution. Alternatively, the precatalyst, the organophosphorus ligand, and the cocatalyst may be dissolved in respective solutions and then added during polymerization. In the case of when the catalyst mixture is dissolved in a solvent, examples of the available solvent may include dichloromethane, dichloroethane, toluene, chlorobenzene, and a mixture thereof.

In the present invention, a total amount of an organic solvent of a reaction system may be 50 to 800% and preferably 50 to 400% based on a total weight of the monomers in the monomer solution. In the case of when the total amount is less than 50%, since viscosity of the solution is very high during the polymerization reaction, it is difficult to perform agitation, and unreacted monomers remain, resulting in reduced polymerization yield. Furthermore, since an excessive amount of solvent needs to be added to dilute the solution due to the very high viscosity, it is difficult to commercialize the catalyst mixture. In the case of when the total amount is more than 800%, since a polymerization reaction speed is low, both the polymerization yield and the molecular weight are reduced.

The catalyst mixture that is used in the present invention may be a metal catalyst complex that contains the precatalyst, the organophosphorus ligand, and the cocatalyst. With respect to the amount of used catalyst mixture, a molar ratio of the precatalyst component to a total mole number of the monomers in the monomer solution may be 1/400 to 1/200,000. That is, it is possible to polymerize norbornene monomers having the polar functional group at high yield even if a still smaller amount of catalyst is used as compared to a known catalyst system. The amount is more preferably 1/500 to 1/20,000, and most preferably 1/5,000 to 1/15,000.

In the case of when a molar ratio of the precatalyst to the monomers is more than 1/400, it is difficult to remove the catalyst. In the case of when the molar ratio is less than 1/200,000, the polymerization activity is undesirably low.

A norbornene addition polymer that has the polar functional group produced by using the method of the present invention includes at least 0.1 to 99.9 mole % of norbornene monomers having the polar functional group. In connection with this, norbornene having the polar group includes a mixture of endo and exo isomers regardless of a mixture compositional ratio. Additionally, in the method according to the present invention, the monomer solution may further contain a cyclic olefin having no polar functional group.

In this case, in order to produce the cyclic olefin addition polymer having the polar functional group according to the present invention, the norbornene monomers having one or more polar functional groups may be subjected to addition polymerization in the above-mentioned catalyst system to produce a homopolymer, the norbornene monomers having different polar functional groups may be subjected to addition polymerization to produce a secondary or tertiary copolymer of norbornene monomers having the polar functional groups, or the norbornene monomers having the polar functional groups and the norbornene monomers having no polar functional group may be subjected to addition polymerization and copolymerization to produce a secondary or tertiary copolymer.

Like a typical method of polymerizing norbornene polymers, in the addition polymerization according to the present invention, the norbornene monomers and the catalyst are dissolved or mixed with each other in the solvent to perform polymerization. In the case of when the cyclic olefin addition polymer having the polar functional group is produced by using the polymerization method according to the present invention, the production may be performed with at least 40% yield. In addition, the molecular weight (Mw) of the produced addition polymer may be at least 10,000 to 1,000,000, which means that the polymer has the high molecular weight. Furthermore, in the case of when an optical film is produced by using the addition polymers, it is preferable that the molecular weight be controlled in the range of 100,000 to 1,000,000. In order to control the molecular weight, linear, branched, or cyclic olefins having 1 to 20 carbon atoms may be further contained. Specific examples of the olefins include 1-hexene, 1-octene, cyclopentene, and ethylene. The olefins are inserted into terminals of growing polymer chains and hydrogen at β-position of the inserted olefin is easily removed to form a polymer chain having a desired molecular weight.

Therefore, in a related art, the cyclic olefin addition polymer having the polar functional group is produced at very low yield while the molecular weight thereof is low. However, in the production method according to the present invention, it is possible to produce the cyclic olefin addition polymer having the high molecular weight and the polar functional group at high yield.

The norbornene polymer having the polar functional group that is produced according to the production method according to the present invention may be an addition homopolymer of only the cyclic olefin monomers having the polar functional group represented by Formula 4 or an addition copolymer of the cyclic olefin monomers having two or more polar functional groups. The norbornene polymer may further include the other olefin monomers.

The present invention provides the cyclic olefin polymer having the polar functional group. Preferably, the norbornene polymer having the polar functional group that is produced according to the production method of the present invention is an addition polymer of the cyclic olefin monomers having the polar functional group represented by Formula 4 and a cyclic olefin polymer that has a polar functional group and a weight average molecular weight (Mw) of 10,000 to 1,000,000.

In the case of when the weight average molecular weight is less than 10,000, there is a problem in that a film is brittle during production of the film. In the case of when the weight average molecular weight is more than 1,000,000, since it is difficult to be dissolved in an organic solvent, there is a problem in that processability is poor.

The polymer is transparent and has excellent adhesion strength to metal or a polymer having the other polar functional group and a low dielectric constant so that the polymer is capable of being used as an insulating electronic material, and is a cyclic olefin polymer having excellent thermal stability and strength. In addition, the polymer may be attached to a substrate made of an electronic material without a coupling agent and to a metal substrate such as copper, silver, or gold. The polymer has excellent optical characteristics so that the polymer is capable of being used as a protective film of a polarizing plate, and may be used as electronic materials such as integrated circuits, printed circuit boards, or multichip modules.

According to the present invention, an optical anisotropic film may be produced by using the polymer so that birefringence is capable of being controlled. This cannot be produced in the related art.

Since a conformational unit of a typical cyclic olefin has one or two stable rotation states, it is possible to form an extended structure like polyimide having a rigid phenyl ring as a main chain. In the case of when the polar group is added to the norbornene polymer having the extended structure, interaction between molecules is increased due to addition of the polar group in comparison with a polymer having a simple structure. Accordingly, since the directional order is obtained during packing of the molecules, optical and electrical anisotropic properties are ensured.

The birefringence may be controlled according to the type and content of the polar functional group which is provided to the cyclic olefin addition polymer. Particularly, since a thickness refraction index is easily controlled, it is possible to produce an optical compensation film for various modes of LCDs (Liquid crystal display).

In order to produce the optical anisotropic film, the cyclic olefin addition polymer having the polar functional group according to the present invention may be dissolved in a solvent to form a film or a sheet by using a solvent casting method and the film may be produced from blends of one or more cyclic olefin polymers.

In the case of when the cyclic olefin addition polymer is dissolved in the solvent and the film is produced by using the solvent casting method, preferably, the cyclic olefin addition polymer is added to the solvent in the content of 5 to 95 wt %, and more preferably 10 to 60 wt % based on the content of the polymer and then agitated at normal temperature to produce the film. In connection with this, it is preferable that the viscosity of the produced solution be 100 to 10,000 cps in order to perform the solvent casting. More preferably, the viscosity is 300 to 8,000 cps. In addition, during the production of the film, in order to improve mechanical strength, heat resistance, light resistance, and treatment property of the film, additives such as plasticizers, deterioration-preventing agents, UV stabilizers, or antistatic agents may be added.

The produced film has characteristics of the optical anisotropic film where the thickness retardation value (Rth) represented by Equation 1 is 70 to 1,000 nm. For reference, the definition of the in-plane retardation value ($R_e$) is shown in Equation 2.

$$R_{th} = \Delta(n_y - n_z) \times d \qquad \text{[Equation 1]}$$

$$R_e = \Delta(n_x - n_y) \times d \qquad \text{[Equation 2]}$$

In Equations 1 and 2, $n_x$ is an in-plane refraction index of a slow axis measured at wavelength 550 nm, $n_y$ is an in-plane refraction index of a fast axis measured at a wavelength of 550 nm, $n_z$ is a thickness refraction index measured at the wavelength of 550 nm, and d is a thickness of the film.

The film that has optical anisotropic characteristics may be a negative C-plate type optical compensation film for various modes of liquid crystal displays satisfying a refraction index correlation where $n_x \approx n_y \geq n_z$ ($n_x$ is an in-plane refraction index of a slow axis, $n_y$ is the refraction index of the fast axis, and $n_z$ is the thickness refraction index).

Furthermore, the present invention provides a catalyst composition for producing a cyclic olefin polymer having a polar functional group. The catalyst composition includes a precatalyst containing metal of Group 10, which is represented by Formula 1 and includes a ligand containing a hetero atom directly coordinated with the metal, an organophosphorus ligand represented by Formula 2, and a cocatalyst that is a salt compound slightly coordinated with the metal of Group 10 represented by Formula 3 and providing an anion.

In the catalyst composition, it is preferable that borate or aluminate of Formula 3 contain anions represented by Formula 3a or 3b.

Meanwhile, preferably, in the catalyst composition for producing the cyclic olefin polymer having the polar functional group, the precatalyst represented by Formula 1 and the organophosphorus ligand represented by Formula 2 are a precatalyst represented by Formula 5 and an organophosphorus ligand represented by Formula 6, respectively.

More preferably, in the catalyst composition for producing the cyclic olefin polymer having the polar functional group, the precatalyst represented by Formula 1 and the organophosphorus ligand represented by Formula 2 are a precatalyst containing Pd metal represented by Formula 7 and an organophosphorus ligand represented by Formula 8, respectively. In addition, it is preferable that the organophosphorus ligand represented by Formula 2 be an organophosphorus ligand represented by Formula 9.

Particularly, it is preferable that the organophosphorus ligand represented by Formula 2 be an organophosphorus compound represented by Formulae 10 to 14.

To be more specific, preferably, in the case of the catalyst composition for producing the cyclic olefin polymer having the polar functional group, in the precatalyst represented by Formula 1, the metal is Pd, p is 2, the ligand containing the hetero atom directly coordinated with the metal is acetylacetonate or acetate, the organophosphorus ligand represented by Formula 2 is (3,5-dioxa-4-phospha-cyclohepta[2,1-a;3,4-a']dinaphthalen-4-yl)dimethylamine represented by Formula 10, and [Cat] is N,N-dimethylphenyl ammonium and [Ani] is tetrakis(pentafluorophenyl)borate in a first cocatalyst represented by Formula 3.

Mode for Invention

A better understanding of the present invention may be obtained in light of the following Examples which are set forth to illustrate, but are not to be construed to limit the present invention.

In the following Preparation Example and Example, an operation in which compounds sensitive air or water were treated was performed by using a standard Schlenk technique or a dry box technique. The nuclear magnetic resonance spectrum was obtained by using a Bruker 300 spectrometer, $^1$H NMR was measured at 300 MHz, and $^{13}$C NMR was measured at 75 MHz. The molecular weight and the molecular weight distribution of the polymer were measured by using GPC (gel permeation chromatography). In this connection, a polystyrene sample was used as the standard. Thermal analysis such as TGA and DSC was performed by using TA Instrument (TGA 2050; heating rate 10 K/min). Toluene was distilled and purified by using sodium/benzophenone, and dichloromethane was distilled and purified by using $CaH_2$.

<Production of Monomer Having Polar Functional Group>

PREPARATION EXAMPLE 1

Production of 5-norbornene-2-methyl acetate

After DCPD (Aldrich, Co., 248 ml, and 1.852 mol), allylacetate (Aldrich, Co., 500 ml, and 4.63 mol), and hydroquinone (0.7 g and 0.006 mol) were put into a 2L high-pressure reactor, the temperature was increased to 190° C. The resulting mixture was agitated at 300 rpm and the reaction was performed for 5 hours. Once the reaction was finished, the reactants were cooled and moved to the distillation device. Distillation was performed twice at reduced pressure of 1 torr by using the vacuum pump to obtain a product at 56° C. (Yield: 30%, exo/endo=57/43).

$^1$H-NMR (300 MHz, $CDCl_3$): δ 6.17~5.91 (m, 2H), 4.15~3.63 (m, 2H), 2.91~2.88 (m, 2H), 2.38 (m, 1H), 2.05 (s, 3H), 1.83 (m, 1H), 1.60~1.25 (m, 2H), 0.57 (m, 1H).

<Production of Addition Polymer>

EXAMPLE 1

Polymerization of 5-norbornene-2-methyl acetate (phosphoramidite compound A)

33.3 mg of $Pd(OAc)_2$ (0.0494 mmol and 1 eq.) and 79.2 mg of $[C_6H_5Nme_2H]^+[B(C_6F_5)_4]^-$ (2 eq. and 0.0988 mmol) were dissolved in 2 ml of dichloromethane and then added to a 100 ml Schlenk flask in which 4 ml of 5-norbornene-2-methyl acetate (NB—$CH_2$—O—C(O)—$CH_3$) (24.7 mmol and AANB/Pd=500/1) and 8 ml of toluene were contained at 90° C. Next, 2 ml of dichloromethane in which 17.8 mg of (3,5-Dioxa-4-phospha-cyclohepta[2,1- a;3,4-a']dinaphthalen-4-yl)dimethylamine) (0.0494 mmol, 1 eq., and phosphoramidite compound A) was dissolved and which was exposed to air was put into the Schlenk flask. Subsequently, the solution was maintained at 90° C. and agitated for 16 hours. The polymerization solution was then added to an excessive amount of ethanol to produce 2.86 g of polymer (Yield 70%). The weight average molecular weight (Mw) of the polymer was 129,500 and Mw/Mn of the polymer was 1.39.

EXAMPLE 2

Polymerization of 5-norbornene-2-methyl acetate (phosphoramidite compound B)

4 ml of 5-norbornene-2-methyl acetate (NB—$CH_2$—O—C(O)—$CH_3$) (24.7 mmol and monomer/Pd=500/1) and 12 ml of toluene were added to a 100 ml Schlenk flask. 2 ml of dichloromethane solution in which 33.3 mg of $Pd(OAc)_2$ (0.0494 mmol and 1 eq.) and 79.2 mg of $[C_6H_5NMe_2H]^+[B(C_6F_5)_4]^-$ (2eq. and 0.0988 mmol) were dissolved was then added. Agitation was performed while the temperature of the Schlenk flask was increased to 90° C. 0.16 ml of dibenzyl diisopropylphosphoramidite (phosphoramidite compound B) that was exposed to air was dissolved in 10 ml of dichloromethane, and 1 ml of resulting solution was put into the flask (0.016 ml, 0.0494 mmol, and 1 eq.). Subsequently, the solution was maintained at 90° C. and agitated for 16 hours. After the temperature was reduced to normal temperature, the polymerization solution was added to an excessive amount of ethanol to produce 2.13 g of product (52%). The weight average molecular weight (Mw) of the polymer was 139,800 and Mw/Mn of the polymer was 1.91.

EXAMPLE 3

Polymerization of 5-norbornene-2-methyl acetate (phosphoramidite compound C)

5-norbornene-2-methyl acetate (NB—$CH_2$—O—C(O)—$CH_3$) (4 mL, 24.7 mmol, and NB means norbornene) and toluene (12 mL) were put into a 100 mL schlenk flask. 2 mL of dichloromethane was added to palladium acetate (Pd ($OAc)_2$) (OAc=acetate, 33.3 mg, and 49.4 μmol) and N,N-dimethylphenyl ammonium (tetrakis(pentafluorophenyl)borate) ($C_6H_5NMe_2H$][$B(C_6F_5)_4$]) (79.2 mg and 98.8 μmol) to perform dissolution, and the resulting solution was added to the monomer solution. The reaction temperature was increased to 90° C. and agitation was performed. 0.16 ml of di-tert-butyl-N,N-diisopropylphosphoramidite (phosphoramidite compound C) that was exposed to air was added to 10 ml of dichloromethane and then dissolved therein, and 1 ml of resulting solution (di-tert-butyl N,N-diisopropylphosphoramidite 0.016 ml, and 49.4 μmol) was added to the monomer solution. Subsequently, the reaction temperature was maintained at 90° C. and agitation was performed for 16 hours. After the reaction, the temperature was cooled to normal temperature, 100 mL of toluene was added to dilute the polymer solution having high viscosity, and the resulting solution was added to an excessive amount of ethanol to obtain a white copolymer precipitate. The precipitate was filtered by using a glass funnel to collect the copolymer, and the collected copolymer was dried in a vacuum oven at 80° C. for 24 hours to obtain 3.28 g of 5-norbornene-2-methyl acetate polymer (80 wt % on the basis of added monomers). The weight average molecular weight (Mw) of the polymer was 107,300 and Mw/Mn of the polymer was 1.72.

EXAMPLE 4

Polymerization of 5-norbornene-2-methyl acetate (phosphoramidite compound D)

The procedure of Example 1 was repeated, except that 21.5 mg of (3,5-dioxa-4-phospha-cyclohepta[2,1-a;3,4-a']dinaphthalen-4-yl) [1-phenylethyl]amine) (phosphoramidite compound D) (0.0494 mmol and 1 eq.) was used instead of 17.8 mg of (3,5-dioxa-4-phospha-cyclohepta[2,1-a;3,4-a']dinaphthalen-4-yl)dimethylamine (phosphoramidite compound A) of Example 1. Thereby, 2.92 g of 5-norbornene-2-methyl acetate polymer (71 wt % on the basis of added monomers) was obtained. The weight average molecular weight (Mw) of the polymer was 170,700 and Mw/Mn of the polymer was 1.61.

EXAMPLE 5

Polymerization of 5-norbornene-2-methyl acetate (phosphoramidite compound E)

The procedure of Example 1 was repeated, except that 14.9 mg of N,N-dimethyl-4,6-diphenyl-1,3,2-dioxaphophorinan-2-amine(phosphoramidite compound E) of Formula 13 (0.0494 mmol and 1 eq.) was used instead of 17.8 mg of phosphoramidite compound A of Example 1. Thereby, 2.84 g of 5-norbornene-2-methyl acetate polymer (69 wt % on the basis of added monomers) was obtained. The weight average molecular weight (Mw) of the polymer was 143,000 and Mw/Mn of the polymer was 1.89.

EXAMPLE 6

Polymerization of 2-butyl-5-norbornene (phosphoramidite compound F)

4 ml of 2-butyl-5-norbornene (23.2 mmol and monomer/Pd=1,000/1) and 12 ml of toluene were put into a 100 ml Schienk flask, and the temperature of the Schienk flask was then maintained at 70° C. Next, 2 ml of methylene chloride solution in which 15.6 mg of Pd(OAc)$_2$ (0.0232 mmol and 1 eq.) and 37.2 mg of [C$_6$H$_5$NMe$_2$H]$^+$[B(C$_6$F$_5$)$_4$]$^-$ (2 eq. and 0.0464 mmol) were dissolved was added. Subsequently, 12.5 mg of (3,5-dioxa-4-phospha-cyclohepta[2,1-a;3,4- a']dinaphthalen-4-yl)bis[1-phenylethyl]amine (phosphoramidite compound F) (0.0232 mmol and 1 eq.) that was exposed to air was dissolved in 1 ml of methylene chloride, and then put into the flask. The temperature of the Schlenk flask was maintained at 70° C. and agitation was performed for 16 hours. After the temperature was reduced to normal temperature, the solution in the flask was slowly added to an excessive amount of ethanol to produce 0.46 g of polymer (13%). The weight average molecular weight (Mw) of the polymer was 36,000 and Mw/Mn of the polymer was 1.29.

EXAMPLE 7

Polymerization of 2-butyl-5-norbornene (phosphoramidite compound G)

The procedure of Example 6 was repeated, except that 12.5 mg of (2,2-dimethyl-4,4,8,8-tetraphenyl-tetrahydro-[1,3]dioxolo[4,5-e][1,3,2]dioxaphosphepin-6-yl)dimethylamine) (phosphoramidite compound G) (0.0232 mmol and 1 eq.) was used instead of 12.5 mg of phosphoramidite compound F of Example 6. Thereby, 1.37 g of 2-butyl-5-norbornene polymer (39 wt % on the basis of added monomers) was obtained. The weight average molecular weight (Mw) of the polymer was 37,000 and Mw/Mn of the polymer was 1.37.

EXAMPLE 8

Polymerization of 2-butyl-5-norbornene (phosphoramidite compound H)

The procedure of Example 6 was repeated, except that 9.0 mg of (2,6-dimethyl-3,5-dioxa-4-phospha-cyclohepta[2,1-a; 3,4-a']dinaphthalen-4-yl)dimethylamine (phosphoramidite compound H) (0.0232 mmol and 1 eq.) was used instead of 12.5 mg of phosphoramidite compound F of Example 6. Thereby, 2.88 g of 2-butyl-5-norbornene polymer (83 wt % on the basis of added monomers) was obtained. The weight average molecular weight (Mw) of the polymer was 78,000 and Mw/Mn of the polymer was 2.06.

EXAMPLE 9

Polymerization of 2-butyl-5-norbornene (phosphoramidite compound I)

The procedure of Example 6 was repeated, except that 8.5 mg of (8,9,10,11,12,13,14,15-octahydro-3,5-dioxa-4-phospha-cyclohepta[2,1-a;3,4-a']dinaphthalen-4-yl)dimethylamine (phosphoramidite compound I) (0.0232 mmol and 1 eq.) was used instead of 12.5 mg of phosphoramidite compound F of Example 6. Thereby, 1.7 g of 2-butyl-5-norbornene polymer (49 wt % on the basis of added monomers) was obtained. The weight average molecular weight (Mw) of the polymer was 226,000 and Mw/Mn of the polymer was 2.10.

EXAMPLE 10

Polymerization of 5-norbornene-2-carboxylic acid methyl ester (phosphoramidite compound A)

33.3 mg of Pd(OAc)$_2$ (0.0494 mmol and 1 eq.) and 79.2 mg of [C$_6$H$_5$NMe$_2$H]$^+$[B(C$_6$F$_5$)$_4$]$^-$ (2 eq. and 0.0988 mmol) were dissolved in 2ml of dichloromethane, and then put into a 100 ml Schlenk flask which contained 3.76 g of 5-norbornene-2-carboxylic acid methyl ester (NB—CH$_2$—C(O)—O—CH$_3$) (24.7 mmol and monomer/Pd=500/1) and 8 ml of toluene at 90° C. Next, 2 ml of dichloromethane in which 17.8 mg of (3,5-dioxa-4-phospha-cyclohepta[2,1-a;3,4-a']dinaphthalen-4-yl)dimethylamine (phosphoramidite compound A) (0.0494 mmol and 1 eq.) that was exposed to air was dissolved was put into the Schlenk flask. Subsequently, the temperature of the flask was maintained at 90° C. and agitation was performed for 16 hours. Next, the polymerization solution was added to an excessive amount of ethanol to produce 2.74 g of polymer (Yield 73%). The weight average molecular weight (Mw) of the polymer was 89,700 and Mw/Mn of the polymer was 1.92.

COMPARATIVE EXAMPLE 1

Polymerization of 5-norbornene-2-methyl acetate (tricyclohexyl phosphine)

The procedure of Example 1 was repeated, except that 13.9 mg of tricyclohexyl phosphine compound that was exposed to air was used instead of 17.8 mg of phosphoramidite compound A. Thereby, 0.73 g of 5-norbornene-2-methyl acetate polymer (18 wt % on the basis of added monomers) was obtained. The weight average molecular weight (Mw) of the polymer was 20,300 and Mw/Mn of the polymer was 1.68.

COMPARATIVE EXAMPLE 2

Polymerization of 5-norbornene-2-methyl acetate (triphenyl phosphite)

The procedure of Example 1 was repeated, except that 15.3 mg of triphenyl phosphite ($P(OC_6H_5)_3$, Z, Z' and Z" are the same oxygen atom in Formula 2) compound (0.0494 mmol) that was exposed to air was used instead of 17.8 mg of phosphoramidite compound A. Thereby, 0.52 g of 5-norbornene-2-methyl acetate polymer (13 wt % on the basis of added monomers) was obtained. The weight average molecular weight (Mw) of the polymer was 18,900 and Mw/Mn of the polymer was 1:59.

<Production of Optical Anisotropic Film>

EXPERIMENTAL EXAMPLES 1 AND 2

The polymers that were obtained in the above-mentioned Examples 1 and 2 were mixed so as to obtain the compositions described in the following Table 1, thus producing coating solutions. Each of the coating solutions was cast on a glass substrate by using a knife coater or barcoater, dried at normal temperature for 1 hour, and additionally dried in a nitrogen atmosphere at 100° C. for 18 hours. After the drying, the dried substrate was stored at −10° C. for 10 sec, and the film was separated from the glass substrate by using a knife to obtain a transparent film having a uniform thickness where a thickness deviation is less than 2%. The thickness and light transmission at 400 to 700 nm of the film are described in the following Table 1.

TABLE 1

| | Composition of film solution | | Physical properties of film | |
|---|---|---|---|---|
| | Polymer (part by weight) | Solvent (part by weight) | Thickness (μm) | Light transmission (%) |
| Experimental Example 1 | Polymer produced in Example 1 | THF 560 | 115 | 92 |
| Experimental Example 2 | Polymer produced in Example 2 | MC 360 and TOLUENE 200 | 119 | 92 |

In the above-mentioned Table 1, THF is tetrahydrofuran and MC is methylene chloride.

<Measurement of Optical Anisotropic Properties>

EXPERIMENTAL EXAMPLES 3 AND 4

In respects to the transparent films of Experimental Examples 1 and 2, the refraction index (n) was measured by using an ABBE refractometer, the in-plane retardation value ($R_e$) was measured by using an automatic birefringence analyzer (KOBRA-21 ADH manufactured by Oji scientific instrument, Co., Ltd.), the retardation value ($R_θ$) was measured in the case of when incident light meets the film surface at the angle of 50°, and the retardation value ($R_{th}$) in respects to the direction through the film thickness and the in-plane x-axis was obtained by using the following Equation 3.

$$R_{th} = \frac{R_θ \times \cos θ_f}{\sin^2 θ_f} \quad \text{[Equation 3]}$$

In Equation 3, θ is a declined angle, and $θ_f$ is a internal angle of film.

In addition, the $R_e$ and $R_{th}$ values were divided by the thickness of the film to obtain a difference in refraction index ($n_x - n_y$) and a difference in refraction index ($n_y - n_z$). ($n_x - n_y$), $R_θ$, $R_{th}$, and ($n_y$'$n_z$) of the transparent film are described in the following Table 2.

TABLE 2

| | n (refraction index) | $(n_x - n_y) \times 10^3$ | $R_{th}$ (nm/μm) | $(n_y - n_z) \times 10^3$ |
|---|---|---|---|---|
| Experimental Example 3 | 1.51 | 0.009 | 2.31 | — |
| Experimental Example 4 | 1.49 | 0.008 | 2.22 | 2.12 |

Furthermore, in the case of when the triacetate cellulose film where $n_y > n_z$ was provided to measure $R_θ$, the $R_θ$ values of all the cyclic olefin films were increased. This means that $R_{th}$ of the cyclic olefin film is caused by the negative birefringence ($n_y > n_z$) in the thickness direction.

The invention claimed is:

1. A method of producing a cyclic olefin polymer having a polar functional group, comprising the step of:
   bringing a catalyst mixture into contact with a monomer solution containing cyclic olefin monomers having a polar functional group,
   wherein the catalyst mixture includes a precatalyst containing metal of Group 10 represented by Formula 1, an organophosphorus ligand represented by Formula 2, and a cocatalyst that is a salt compound slightly coordinated with the metal of Group 10 represented by Formula 3 and providing an anion:

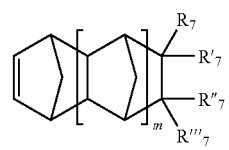

[Formula 4]

wherein Xs are each independently a hetero atom selected from S, O, and N, $R_1$s are each independently —CH=CHR$^{20}$, —OR$^{20}$, —SR$^{20}$, —N(R$^{20}$)$_2$, —N=NR$^{20}$, —P(R$^{20}$)$_2$, —C(O)R$^{20}$, —C(R$^{20}$)=NR$^{20}$, —C(O)OR$^{20}$, —OC(O)R$^{20}$, —C(R$^{20}$)=CHC(O)R$^{20}$, —R$^{21}$C(O)R$^{20}$, —R$^{21}$ C(O)OR$^{20}$, or —R$^{21}$ OC(O)R$^{20}$; R$^{20}$s are each independently hydrogen, halogen, linear or branched alkyl having 1 to 5 carbon atoms, linear or branched haloalkyl having 1 to 5 carbon atoms, cycloalkyl having 5 to 10 carbon atoms, linear or branched alkenyl having 2 to 5 carbon atoms, linear or branched haloalkenyl having 2 to 5 carbon atoms, or substituted or unsubstituted aralkyl having 7 to 24 carbon atoms; R$^{21}$ is hydrocarbylene having 1 to 20 carbon atoms, $R_2$s are each independently linear or branched alkyl having 1 to 20 carbon atoms, linear or branched alkenyl having 2 to 20 carbon atoms, linear or branched vinyl having 2 to 20 carbon atoms, cycloalkyl having 5 to 12 carbon atoms unsubstituted or substituted with hydrocarbon, aryl having 6 to 40 carbon atoms unsubstituted or substituted with hydrocarbon, aralkyl having 7 to 15 carbon atoms unsubstituted or substituted with hydrocarbon, or alkynyl having 3 to 20 carbon atoms, M is metal of Group 10, and p is 0 to 2, $$[Z(R_3)_a]\text{—}P[Z'(R_4)_b][Z''(R_5)_c] \quad \text{[Formula 2]}$$

wherein a, b, and c are each an integer in the range of 1 to 3,

Z, Z', and Z'' are each independently oxygen, sulfur, silicon, or nitrogen, with a proviso that Z, Z', and Z'' are not the same atom, $R_3$, $R_4$, and $R_5$ are each independently hydrogen; linear or branched alkyl having 1 to 20 carbon atoms; linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group containing a hetero ring; alkylaryl having 7 to 15 carbon atoms unsubstituted or substituted with alkoxy or hydrocarbon; alkylaryl substituted with a substituent group containing a hetero ring; alkynyl having 3 to 20 carbon atoms; silyl each independently substituted with linear or branched alkyl having 1 to 10 carbon atoms; silyl each independently substituted with linear or branched alkoxy having 1 to 10 carbon atoms; silyl each independently substituted with substituted or unsubstituted cycloalkyl having 3 to 12 carbon atoms; silyl each independently substituted with substituted or unsubstituted aryl having 6 to 40 carbon atoms; silyl each independently substituted with substituted or unsubstituted aryloxy having 6 to 40 carbon atoms; siloxy each independently substituted with linear or branched. alkyl having 1 to 10 carbon atoms; siloxy each independently substituted with substituted or unsubstituted cycloalkyl having 3 to 12 carbon atoms; or siloxy each independently substituted with substituted or unsubstituted aryl having 6 to 40 carbon atoms; each of the substituent groups is halogen or haloalkyl having 1 to 20 carbon atoms; $R_4$ and $R_5$ may be bonded to each other to form a ring; and the hetero ring includes an aromatic or an aliphatic ring in the substituent groups containing the hetero ring, $$[\text{Cat}][\text{Ani}] \quad \text{[Formula 3]}$$

wherein [Cat] is a cation and any one selected from the group consisting of hydrogen, cations of metal of Group 1, metal of Group 2, or transition metal, and an organic unit containing the cations, and

[Ani] is an anion that is slightly coordinated with metal M of Formula 1 and any one selected from the group consisting of borate, aluminate, $[SbF_6]$—, $[PF_6]$—, $[AsF_6]$—, perfluoroacetate ($[CF_3CO_2]$—), perfluoropropionate ($[C_2F_5CO_2]$—), perfluorobutyrate ($[CF_3CF_2CF_2CO_2]$—), perchlorate ($[ClO_4]$—), p-toluenesulfonate ($[p\text{-}CH_3C_6H_4SO_3]$—), $[SO_3CF_3]$—, boratabenzene, and carborane unsubstituted or substituted with halogen.

2. The method of producing a cyclic olefin polymer having a polar functional group according to claim 1, wherein the bringing of the catalyst mixture into contact with the monomer solution containing cyclic olefin monomers having the polar functional group is performed at 80 to 150° C.

3. The method of producing a cyclic olefin polymer having a polar functional group according to claim 1, wherein the borate or aluminate of Formula 3 contains anions represented by Formula 3a or 3b:

$$[M'(R_6)_4] \quad \text{[Formula 3a]}$$

$$[M'(OR_6)_4] \quad \text{[Formula 3b]}$$

wherein M' is boron or aluminum, and $R_6$s are each independently halogen; linear or branched alkyl having 1 to 20 carbon atoms unsubstituted or substituted with halogen; linear or branched alkenyl having 2 to 20 carbon atoms unsubstituted or substituted with halogen; cycloalkyl having 3 to 12 carbon atoms unsubstituted or substituted with halogen; aryl having 6 to 40 carbon atoms unsubstituted or substituted with hydrocarbon; aryl having 6 to 40 carbon atoms substituted with linear or branched trialkylsiloxy having 3 to 20 carbon atoms or linear or branched triarylsiloxy having 18 to 48 carbon atoms; or aralkyl having 7 to 15 carbon atoms unsubstituted or substituted with halogen.

4. The method of producing a cyclic olefin polymer having a polar functional group according to claim 1, wherein the cyclic olefin monomers is a compound represented by Formula 4:

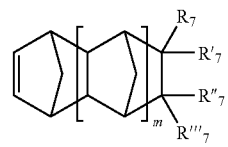

[Formula 4]

wherein m is an integer in the range of 0 to 4, at least one of $R_7$, $R_7'$, $R_7''$, and $R_7'''$ is the polar functional group and the remaining groups are nonpolar functional groups, $R_7$, $R_7'$, $R_7''$, and $R_7'''$ are the same as or different from each other, and each independently hydrogen; halogen; linear or branched alkyl that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a polar functional group that contains at least one of oxygen, nitrogen, phosphorus, sulfur, silicon, and boron, $R_7$ and $R_7'$ or $R_7''$ and $R_7'''$ may be bonded to each other to form an alkylidene group having 1 to 10 carbon atoms or $R_7$ or $R_7'$ may be bonded to any one of $R_7''$ and $R_7'''$ to form a saturated or unsaturated aliphatic ring having 4 to 12 carbon atoms or an aromatic ring having 6 to 24 carbon atoms, the polar functional group is —$R_8OR_9$, —$OR_9$, —$OC(O)OR_9$, —$R_5OC(O)OR_9$, —$C(O)OR_9$, —$R_8C(O)OR_9$, —$C(O)R_9$, —$R_8C(O)R_9$, —$OC(O)R_9$, —$R_8OC(O)R_9$, —$(R_8O)_n$—$OR_9$, —$(OR_8)_n$—$OR_9$, —$C(O)$—$O$—$C(O)R_9$, —$R_8C(O)$—$O$—$C(O)R_9$, —$SR_9$, —$R_8SR_9$, —$SSR_9$, —$R_8SSR_9$, —$S(=O)R_9$, —$R_8S(=O)R_9$, —$R_8C(=S)R_9$—, —$R_8C(=S)SR_9$, —$R_8SO_3R_9$, —$SO_3R_9$, —$R_8N=C=S$, —$N=C=S$, —$NCO$, —$R_8$—$NCO$, —$CN$,

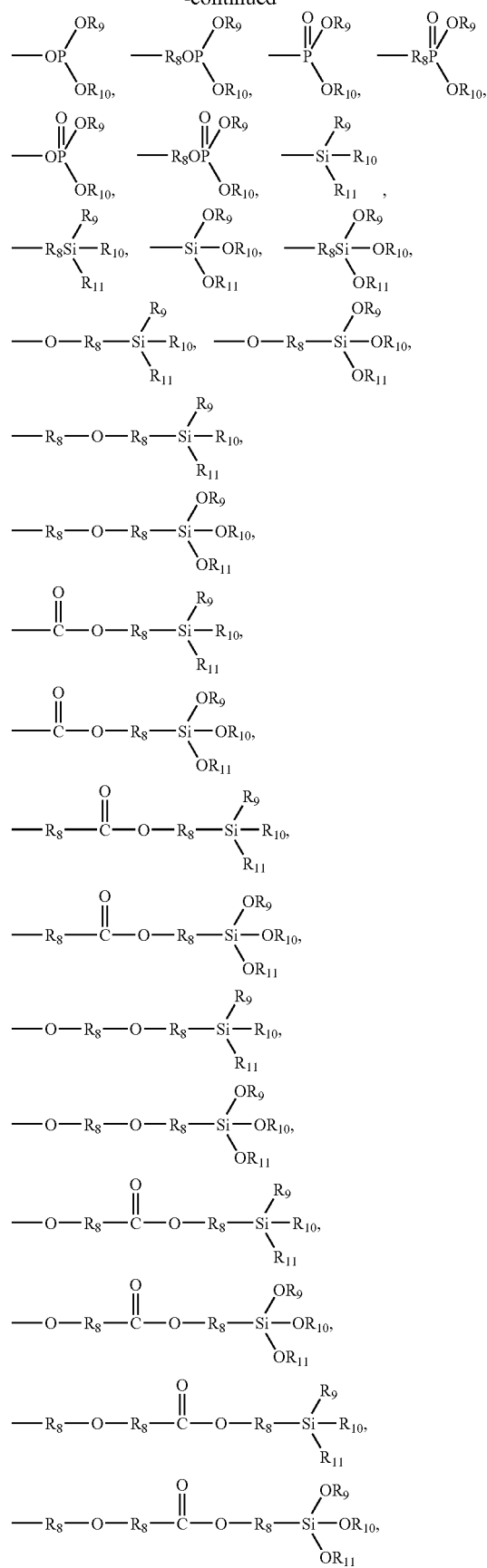

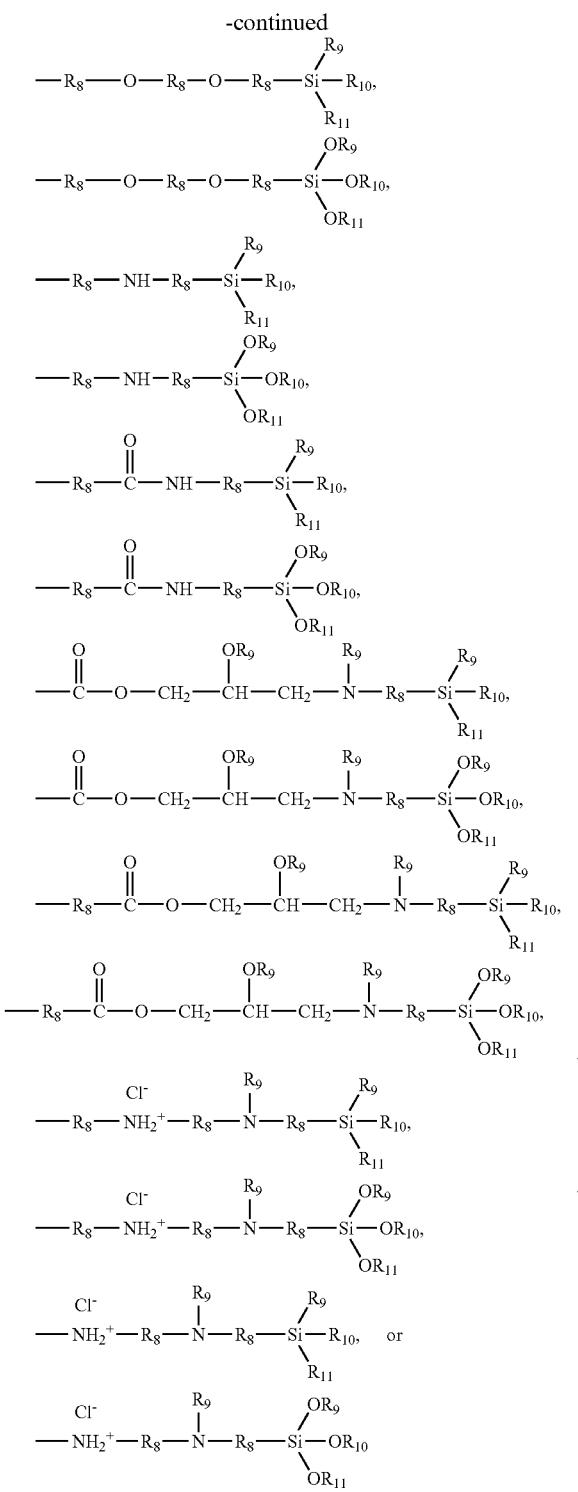

in the polar functional group, $R_8$s are the same as or different from each other, and each independently linear or branched alkylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenylene that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynylene that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkylene that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; arylene that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxylene that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, $R_9$, $R_{10}$, and $R_{11}$ are the same as or different from each other, and each independently hydrogen; halogen; linear or branched alkyl that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxy that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxy that has 1 to 20 carbon atoms and is unsubstituted or substituted with at least one selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, and n's are each independently an integer in the range of 1 to 10.

5. The method of producing a cyclic olefin polymer having a polar functional group according to claim 1, wherein the precatalyst represented by Formula 1 and the organophosphorus ligand represented by Formula 2 are a precatalyst represented by Formula 5 and an organophosphorus ligand represented by Formula 6, respectively:

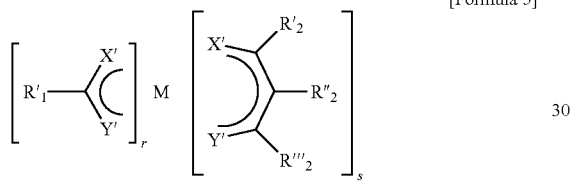

[Formula 5]

wherein X' and Y' are each independently a hetero atom that is selected from the group consisting of S and O, $R_1'$, $R_2'$, $R_2''$, and $R_2'''$ are each independently linear or branched alkyl having 1 to 20 carbon atoms; linear or branched alkenyl having 2 to 20 carbon atoms; linear or branched vinyl having 2 to 20 carbon atoms; cycloalkyl having 5 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms, M is metal of Group 10;

r and s are each independently 0 to 2, and r+s=2,

$[(R_3)_2N]-P[O(R_4)][O(R_5)]$      [Formula 6]

wherein $R_3$, $R_4$, and $R_5$ are each independently hydrogen; linear or branched alkyl having 1 to 20 carbon atoms; linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group containing a hetero ring; alkylaryl having 7 to 15 carbon atoms unsubstituted or substituted with alkoxy or hydrocarbon; alkylaryl substituted with a substituent group containing a hetero ring; alkynyl having 3 to 20 carbon atoms; silyl each independently substituted with linear or branched alkyl having 1 to 10 carbon atoms; silyl each independently substituted with linear or branched alkoxy having 1 to 10 carbon atoms; silyl each independently substituted with substituted or unsubstituted cycloalkyl having 3 to 12 carbon atoms; silyl each independently substituted with substituted or unsubstituted aryl having 6 to 40 carbon atoms; silyl each independently substituted with substituted or unsubstituted aryloxy having 6 to 40 carbon atoms; siloxy each independently substituted with linear or branched alkyl having 1 to 10 carbon atoms; siloxy each independently substituted with substituted or unsubstituted cycloalkyl having 3 to 12 carbon atoms; or siloxy each independently substituted with substituted or unsubstituted aryl having 6 to 40 carbon atoms; each of the substituent groups is halogen or haloalkyl having 1 to 20 carbon atoms; $R_4$ and $R_5$ may be bonded to each other to form a ring; and the hetero ring includes an aromatic or an aliphatic ring in the substituent groups containing the hetero ring.

6. The method of producing a cyclic olefin polymer having a polar functional group according to claim 1, wherein the precatalyst represented by Formula 1 and the organophosphorus ligand represented by Formula 2 are a precatalyst containing Pd metal represented by Formula 7 and an organophosphorus ligand represented by Formula 8, respectively:

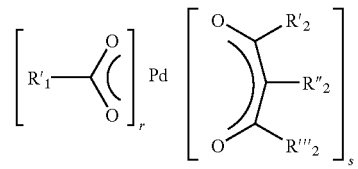

[Formula 7]

wherein $R_1'$, $R_2'$, $R_2''$, and $R_2'''$ are each independently linear or branched alkyl having 1 to 20 carbon atoms; linear or branched alkenyl having 2 to 20 carbon atoms; linear or (branched vinyl having 2 to 20 carbon atoms; cycloalkyl having 5 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms, and r and s are each independently 0 to 2, and r+s=2,

$[(R_{23})_2N]-P[O(R_{24})]_2$      [Formula 8]

wherein $R_{23}$ and $R_{24}$ are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with hydrocarbon; alkylaryl unsubstituted or substituted with alkoxy or hydrocarbon; alkylaryl substituted with a substituent group containing an aliphatic hetero ring; or alkynyl having 3 to 20 carbon atoms; and two $R_{24}$s may be bonded to each other to form a ring.

7. The method of producing a cyclic olefin polymer having a polar functional group according to claim 1, wherein the organophosphorus ligand represented by Formula 2 is an organophosphorus ligand represented by Formula 9:

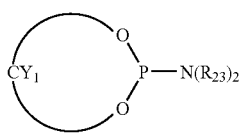

[Formula 9]

wherein $CY_1$ is a substituted or unsubstituted ring that contains two O atoms and one P atom, and $R_{23}$s are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms.

8. The method of producing a cyclic olefin polymer having a polar functional group according to claim 1, wherein the organophosphorus ligand represented by Formula 2 is any one selected from the organophosphorus ligands represented by Formulae 10 to 14:

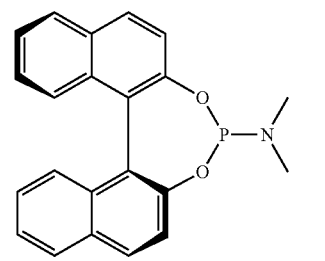

[Formula 10]

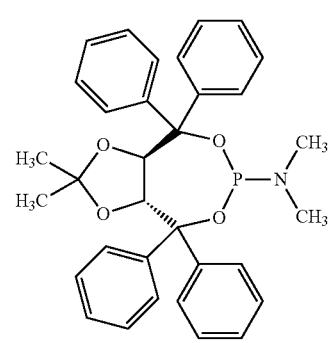

[Formula 11]

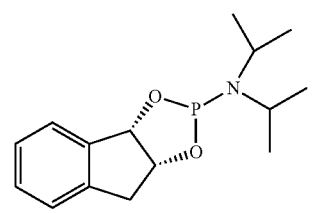

[Formula 12]

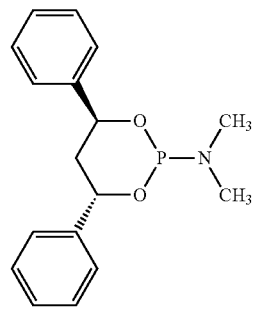

[Formula 13]

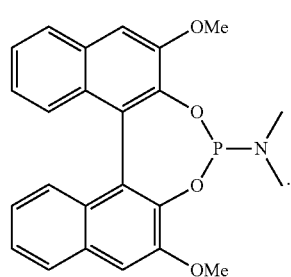

[Formula 14]

9. The method of producing a cyclic olefin polymer having a polar functional group according to claim 1, wherein in the precatalyst represented by Formula 1, the metal is Pd, p is 2, the ligand containing the hetero atom directly coordinated with the metal is acetylacetonate or acetate, the organophosphorus ligand represented by Formula 2 is (3,5-dioxa-4-phospha-cyclohepta [2,1-a;3,4-a']dinaphthalen-4-yl)dimethylamine represented by Formula 10, and [Cat] is N,N-dimethylphenyl ammonium and [Ani] is tetrakis(pentafluorophenyl)borate in a first cocatalyst represented by Formula 3:

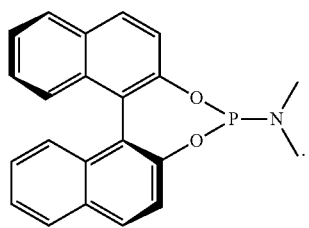

[Formula 10]

10. The method of producing a cyclic olefin polymer having a polar functional group according to claim 1, wherein a content of the cocatalyst is 0.5 to 10 mole based on 1 mole of the precatalyst.

11. The method of producing a cyclic olefin polymer having a polar functional group according to claim 1, wherein the catalyst mixture is carried in a particulate support.

12. The method of producing a cyclic olefin polymer having a polar functional group according to claim 11, wherein the particulate support is at least one selected from the group consisting of silica, titania, silica/chromia, silica/chromia/titania, silica/alumina, aluminum phosphate gel, silanized silica, silica hydro gel, montmorillonite clay, and zeolite.

13. The method of producing a cyclic olefin polymer having a polar functional group according to claim 1,
wherein an organic solvent where the catalyst mixture is dissolved is any one selected from the group consisting of dichloromethane, dichloroethane, toluene, chlorobenzene, and a mixture thereof.

14. The method of producing a cyclic olefin polymer having a polar functional group according to claim 1,
wherein a total amount of the organic solvent of a reaction system is 50 to 800% based on a total weight of the monomers in the monomer solution.

15. The method of producing a cyclic olefin polymer having a polar functional group according to claim 1,
wherein the catalyst mixture includes a metal catalyst complex that contains the precatalyst, the organophosphorus ligand, and the cocatalyst.

16. The method of producing a cyclic olefin polymer having a polar functional group according to claim 1,
wherein the catalyst mixture is added to the monomer solution in a solid phase.

17. The method of producing a cyclic olefin polymer having a polar functional group according to claim 1,
wherein the catalyst mixture is added to a reaction system so that a molar ratio of the precatalyst to a total mole number of the monomers in the monomer solution is 1/400 to 1/200,000.

18. The method of producing a cyclic olefin polymer having a polar functional group according to claim 1,
wherein the monomer solution further contains a cyclic olefin compound having no polar functional group.

19. The method of producing a cyclic olefin polymer having a polar functional group according to claim 1,
wherein the cyclic olefin polymer having the polar functional group includes a cyclic olefin homopolymer having a polar functional group, a copolymer of cyclic olefin monomers having different polar functional groups, or a copolymer of the cyclic olefin monomers having the polar functional groups and the cyclic olefin monomers having no polar functional group.

20. The method of producing a cyclic olefin polymer having a polar functional group according to claim 1,
wherein a weight average molecular weight (Mw) of the cyclic olefin polymer having a polar functional group is 10,000 to 1,000,000.

21. The method of producing a cyclic olefin polymer having a polar functional group according to claim 1,
wherein the monomer solution further comprises linear or branched olefin having 1 to 20 carbon atoms.

22. A catalyst composition for producing a cyclic olefin polymer having a polar functional group, comprising:
a precatalyst containing metal of Group 10, which is represented by Formula 1 and includes a ligand containing a hetero atom directly coordinated with the metal;
an organophosphorus ligand represented by Formula 2; and
a cocatalyst that is a salt compound slightly coordinated with the metal of Group 10 represented by Formula 3 and providing an anion,

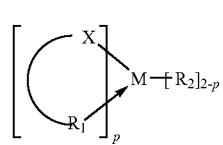

[Formula 1]

wherein Xs are each independently a hetero atom selected from S, O, and N,
$R^1$s are each independently $-CH=CHR^{20}$, $-OR^{20}$, $-SR^{20}$, $-N(R^{20})_2$, $-N=NR°$, $-P(R^{20})_2$, $-C(O)R^{20}$, $-C(R^{20})=NR^{20}$, $-C(O)OR^{20}$, $-C(O)OR^{20}$, $-OC(O)R^{20}$, $-C(R^{20})=CHC(O)R^{20}$, $-R^{21}C(O)R°$, $-R^{21}C(O)OR^{20}$, or $-R^{21}C(O)R^{20}$; $R^{20}$s are each independently hydrogen, halogen, linear or branched alkyl having 1 to 5 carbon atoms, linear or branched haloalkyl having 1 to 5 carbon atoms, cycloalkyl having 5 to 10 carbon atoms, linear or branched alkenyl having 2 to 5 carbon atoms, linear or branched haloalkenyl having 2 to 5 carbon atoms, or substituted or unsubstituted aralkyl having 7 to 24 carbon atoms; $R^{21}$ is hydrocarbylene having 1 to 20 carbon atoms,
$R_2$s are each independently linear or branched alkyl having 1 to 20 carbon atoms, linear or branched alkenyl having 2 to 20 carbon atoms, linear or branched vinyl having 2 to 20 carbon atoms, cycloalkyl having 5 to 12 carbon atoms unsubstituted or substituted with hydrocarbon, aryl having 6 to 40 carbon atoms unsubstituted or substituted with hydrocarbon, aralkyl having 7 to 15 carbon atoms unsubstituted or substituted with hydrocarbon, or alkynyl having 3 to 20 carbon atoms,
M is metal of Group 10, and
p is 0 to 2,

$[Z(R_3)_a]-P[Z'(R_4)_b][Z''(R_5)_c]$     [Formula 2]

wherein a, b, and c are each an integer in the range of 1 to 3,
Z, Z', and Z'' are each independently oxygen, sulfur, silicon, or nitrogen, with a proviso that Z, Z', and Z'' are not the same atom,
$R_3$, $R_4$, and $R_5$ are each independently hydrogen; linear or branched alkyl having 1 to 20 carbon atoms; linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group containing a hetero ring; alkylaryl having 7 to 15 carbon atoms unsubstituted or substituted with alkoxy or hydrocarbon; alkylaryl substituted with a substituent group containing a hetero ring; alkynyl having 3 to 20 carbon atoms; silyl each independently substituted with linear or branched alkyl having 1 to 10 carbon atoms; silyl each independently substituted with linear or branched alkoxy having 1 to 10 carbon atoms; silyl each independently substituted with substituted or unsubstituted cycloalkyl having 3 to 12 carbon atoms; silyl each independently substituted with substituted or unsubstituted aryl having 6 to 40 carbon atoms; silyl each independently substituted with substituted or unsubstituted aryloxy having 6 to 40 carbon atoms; siloxy each independently substituted with linear or branched alkyl having 1 to 10 carbon atoms; siloxy each independently substituted with substituted or unsubstituted cycloalkyl having 3 to 12 carbon atoms; or siloxy each independently substituted with substituted or unsubstituted aryl having 6 to 40 carbon atoms; each of the substituent groups is halogen or haloalkyl having 1 to 20 carbon atoms; $R_4$ and $R_5$ may be bonded to each other to form a ring; and the hetero ring includes an aromatic or an aliphatic ring in the substituent groups containing the hetero ring,

[Cat][Ani]     [Formula 3]

wherein [Cat] is a cation and any one selected from the group consisting of hydrogen, cations of metal of Group 1, metal of Group 2, or transition metal, and an organic unit containing the cations, and

[Ani] is an anion that is slightly coordinated with metal M of Formula 1 and any one selected from the group consisting of borate, aluminate, $[SbF_6]-$, $[PF_6]-$, $[AsF_6]-$, perfluoroacetate $([CF_3CO_2]-)$, perfluoropropionate $([C_2F_5CO_2]-)$, perfluorobutyrate $([CF_3CF_2CF_2CO_2]-)$, perchlorate $([ClO_4]-)$, p-toluenesulfonate $([p\text{-}CH_3C_6H_4SO_3]-)$, $[SO_3CF_3]-$, boratabenzene, and carborane unsubstituted or substituted with halogen.

23. The catalyst composition for producing a cyclic olefin polymer having a polar functional group according to claim 22,
wherein the borate or aluminate of Formula 3 contains anions represented by Formula 3a or 3b:

[M'(R_6)_4]     [Formula 3a]

[M'(OR_6)_4]     [Formula 3b]

wherein M' is boron or aluminum, and $R_6$s are each independently halogen; linear or branched alkyl having 1 to 20 carbon atoms unsubstituted or substituted with halogen; linear or branched alkenyl having 2 to 20 carbon atoms unsubstituted or substituted with halogen; cycloalkyl having 3 to 12 carbon atoms unsubstituted or substituted with halogen; aryl having 6 to 40 carbon atoms unsubstituted or substituted with hydrocarbon; aryl having 6 to 40 carbon atoms substituted with linear or branched trialkylsiloxy having 3 to 20 carbon atoms or linear or branched triarylsiloxy having 18 to 48 carbon atoms; or aralkyl having 7 to 15 carbon atoms unsubstituted or substituted with halogen.

24. The catalyst composition for producing a cyclic olefin polymer having a polar functional group according to claim 22,
wherein the precatalyst represented by Formula 1 and the organophosphorus ligand represented by Formula 2 are a precatalyst represented by Formula 5 and an organophosphorus ligand represented by Formula 6, respectively:

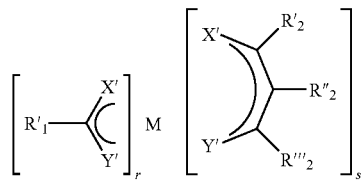

[Formula 5]

wherein X' and Y' are each independently a hetero atom that is selected from the group consisting of S and O, $R_1'$, $R_2'$, $R_2'''$, and $R_2''$ are each independently linear or branched alkyl having 1 to 20 carbon atoms; linear or branched alkenyl having 2 to 20 carbon atoms; linear or branched vinyl having 2 to 20 carbon atoms; cycloalkyl having 5 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms, M is metal of Group 10;

r and s are each independently 0 to 2, and r+s=2, $[(R_3)_2N]-P[O(R_4)][O(R_5)]$     [Formula 6]

wherein $R_3$, $R_4$, and $R_5$ are each independently hydrogen; linear or branched alkyl having 1 to 20 carbon atoms; linear or branched alkoxy having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon; aryl having 6 to 40 carbon atoms unsubstituted or substituted with alkoxy or hydrocarbon; aralkyl having 7 to 15 carbon atoms unsubstituted or substituted with alkoxy or hydrocarbon; aralkyl substituted with a substituent group containing a hetero ring; alkylaryl having 7 to 15 carbon atoms unsubstituted or substituted with alkoxy or hydrocarbon; alkylaryl substituted with a substituent group containing a hetero ring; alkynyl having 3 to 20 carbon atoms; silyl each independently substituted with linear or branched alkyl having 1 to 10 carbon atoms; silyl each independently substituted with linear or branched alkoxy having 1 to 10 carbon atoms; silyl each independently substituted with substituted or unsubstituted cycloalkyl having 3 to 12 carbon atoms; silyl each independently substituted with substituted or unsubstituted aryl having 6 to 40 carbon atoms; silyl each independently substituted with substituted or unsubstituted aryloxy having 6 to 40 carbon atoms; siloxy each independently substituted with linear or branched alkyl having 1 to 10 carbon atoms; siloxy each independently substituted with substituted or unsubstituted cycloalkyl having 3 to 12 carbon atoms; or siloxy each independently substituted with substituted or unsubstituted aryl having 6 to 40 carbon atoms; each of the substituent groups is halogen or haloalkyl having 1 to 20 carbon atoms; $R_4$ and $R_5$ may be bonded to each other to form a ring; and the hetero ring includes an aromatic or an aliphatic ring in the substituent groups containing the hetero ring.

25. The catalyst composition for producing a cyclic olefin polymer having a polar functional group according to claim 22,
wherein the precatalyst represented by Formula 1 and the organophosphorus ligand represented by Formula 2 are a precatalyst containing Pd metal represented by Formula 7 and an organophosphorus ligand represented by Formula 8, respectively:

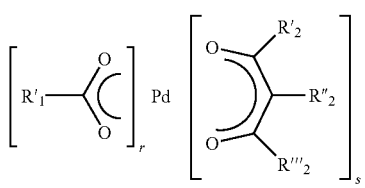 [Formula 7]

wherein $R_1'$, $R_2'$, $R_2''$, and $R_2'''$ are each independently linear or branched alkyl having 1 to 20 carbon atoms; linear or branched alkenyl having 2 to 20 carbon atoms; linear or branched vinyl having 2 to 20 carbon atoms; cycloalkyl having 5 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms, and r and s are each 0 to 2, and r+s=2,

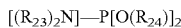 [Formula 8]

wherein $R_{23}$ and $R_{24}$ are each independently hydrogen; linear or branched alkyl having 1 to 20 carbon atoms; linear or branched allyl having 3 to 20 carbon atoms; linear or branched alkenyl having 2 to 20 carbon atoms; linear or branched vinyl having 2 to 20 carbon atoms; cycloalkyl having 3 to 12 carbon atoms unsubstituted or substituted with hydrocarbon;

aryl having 6 to 40 carbon atoms unsubstituted or substituted with alkoxy or hydrocarbon;

aralkyl having 7 to 15 carbon atoms unsubstituted or substituted with hydrocarbon; alkylaryl unsubstituted or substituted with alkoxy or hydrocarbon; alkylaryl substituted with a substituent group containing an aliphatic hetero ring; or alkynyl having 3 to 20 carbon atoms;

and two $R_{24}$s may be bonded to each other to form a ring.

26. The catalyst composition for producing a cyclic olefin polymer having a polar functional group according to claim 22, wherein the organophosphorus ligand represented by Formula 2 is an organophosphorus ligand represented by Formula 9:

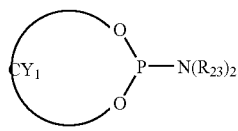 [Formula 9]

wherein $CY_1$ is a substituted or unsubstituted ring that contains two O atoms and one P atom, and $R_{23}$s are each independently hydrogen; linear or branched alkyl, allyl, alkenyl, or vinyl having 1 to 20 carbon atoms; cycloalkyl having 3 to 12 carbon atoms unsubstituted or substituted with hydrocarbon; aryl having 6 to 40 carbon atoms unsubstituted or substituted with hydrocarbon; aralkyl having 7 to 15 carbon atoms unsubstituted or substituted with hydrocarbon; or alkynyl having 3 to 20 carbon atoms.

27. The catalyst composition for producing a cyclic olefin polymer having a polar functional group according to claim 22, wherein the organophosphorus ligand represented by Formula 2 is any one selected from the compounds represented by Formulae 10 to 14:

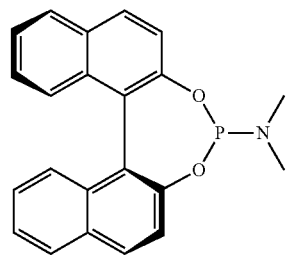 [Formula 10]

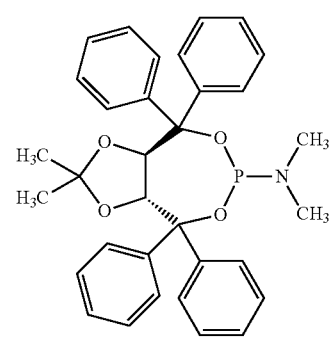 [Formula 11]

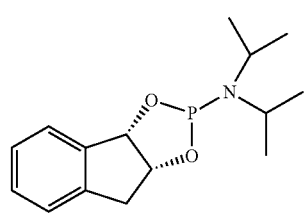 [Formula 12]

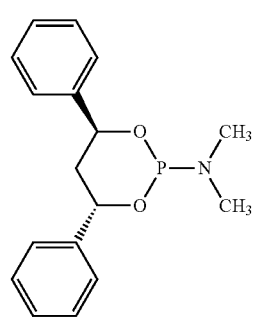 [Formula 13]

-continued

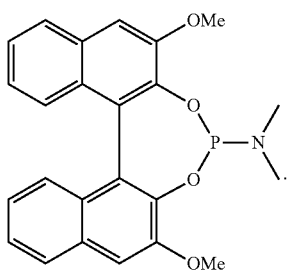

[Formula 14]

28. The catalyst composition for producing a cyclic olefin polymer having a polar functional group according to claim 22,
wherein in the precatalyst represented by Formula 1, the metal is Pd, p is 2, the ligand containing the hetero atom directly coordinated with the metal is acetylacetonate or acetate, the organophosphorus ligand represented by Formula 2 is (3,5-dioxa-4-phospha-cyclohepta [2,1-a;3,4-a']dinaphthalen-4-yl)dimethylamine represented by Formula 10, and [Cat] is N,N-dimethylphenyl ammonium and [Ani] is tetrakis(pentafluorophenyl)borate in a first cocatalyst represented by Formula 3:

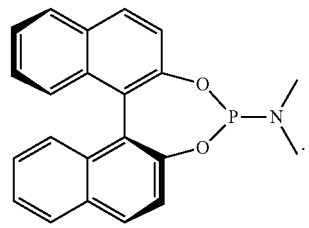

[Formula 10]

* * * * *